(12) United States Patent
Kaafar et al.

(10) Patent No.: US 10,965,671 B2
(45) Date of Patent: Mar. 30, 2021

(54) AUTHENTICATING A USER

(71) Applicant: National ICT Australia Limited, Eveleigh (AU)

(72) Inventors: Dali Kaafar, Eveleigh (AU); Hassan Asghar, Eveleigh (AU); Jagmohan Chauhan, Eveleigh (AU); Jonathan Chan, Eveleigh (AU)

(73) Assignee: NATIONAL ICT AUSTRALIA LIMITED, Eveleigh (AU)

( * ) Notice: Subject to any disclaimer, the term of this patent is extended or adjusted under 35 U.S.C. 154(b) by 260 days.

(21) Appl. No.: 16/099,801

(22) PCT Filed: May 10, 2017

(86) PCT No.: PCT/AU2017/050426
§ 371 (c)(1),
(2) Date: Nov. 8, 2018

(87) PCT Pub. No.: WO2017/193165
PCT Pub. Date: Nov. 16, 2017

(65) Prior Publication Data
US 2019/0141033 A1 May 9, 2019

(30) Foreign Application Priority Data
May 10, 2016 (AU) ................................ 2016901727

(51) Int. Cl.
*H04L 29/06* (2006.01)
*G06F 21/00* (2013.01)
(Continued)

(52) U.S. Cl.
CPC .......... *H04L 63/0861* (2013.01); *G06F 21/32* (2013.01); *G06F 21/36* (2013.01); *G06F 21/40* (2013.01)

(58) Field of Classification Search
CPC ..... H04L 63/0861; G06F 21/32; G06F 21/36; G06F 21/40
See application file for complete search history.

(56) References Cited

U.S. PATENT DOCUMENTS 8,453,207 B1  5/2013  White et al.
8,752,146 B1  6/2014  Van Dijk et al.
(Continued)

FOREIGN PATENT DOCUMENTS

WO  2007/128110 A1  11/2007
WO  2007/134433 A1  11/2007
(Continued)

OTHER PUBLICATIONS

International-Type Search Report for Provisional Australian Application No. 2016/901727, dated Dec. 22, 2016, 8 pages.
(Continued)

*Primary Examiner* — Jeffrey C Pwu
*Assistant Examiner* — Rodman Alexander Mahmoudi
(74) *Attorney, Agent, or Firm* — Kilpatrick Townsend & Stockton LLP

(57) ABSTRACT

Computer-implemented methods, software, and computer systems for authenticating a user. Authentication includes presenting on a first user interface a challenge set of cognitive information elements (400) to the user that comprises a cognitive challenge that has a reference solution based on an intersection of the challenge set of cognitive information elements and a secret set of cognitive information elements. Biometric features of the user can be extracted from a response made by the user to the cognitive challenge on a second user interface, and the user can be authenticated if the biometric feature extracted from the response matches a reference biometric feature.

17 Claims, 11 Drawing Sheets

(51) Int. Cl.
*G06F 21/32* (2013.01)
*G06F 21/40* (2013.01)
*G06F 21/36* (2013.01)

(56) References Cited

U.S. PATENT DOCUMENTS

| | | | |
|---|---|---|---|
| 9,223,955 | B2 | 12/2015 | Lymberopoulos et al. |
| 9,972,047 | B1* | 5/2018 | Elliott .................... G06Q 40/00 |
| 2004/0230843 | A1 | 11/2004 | Jansen |
| 2008/0235788 | A1 | 9/2008 | Saddik et al. |
| 2011/0162067 | A1 | 6/2011 | Shuart et al. |
| 2012/0257162 | A1* | 10/2012 | Encaoua .............. G02C 13/005 351/204 |
| 2013/0212674 | A1 | 8/2013 | Boger et al. |
| 2014/0020089 | A1 | 1/2014 | Perini, II |
| 2014/0289834 | A1 | 9/2014 | Lindemann |
| 2016/0034682 | A1 | 2/2016 | Fiske |
| 2016/0148012 | A1 | 5/2016 | Khitrov et al. |
| 2016/0197918 | A1 | 7/2016 | Turgeman et al. |
| 2016/0203306 | A1* | 7/2016 | Boshra .................... G07C 9/37 726/19 |
| 2017/0067739 | A1* | 3/2017 | Siercks .................. H04N 5/247 |

FOREIGN PATENT DOCUMENTS

| | | |
|---|---|---|
| WO | 2014/137919 A1 | 9/2014 |
| WO | 2014/140426 A1 | 9/2014 |
| WO | 2014/182787 A3 | 11/2014 |
| WO | 2015/172124 A1 | 11/2015 |
| WO | 2016/018488 A2 | 2/2016 |
| WO | 2017/193165 A1 | 11/2017 |

OTHER PUBLICATIONS

Related PCT application AU2017/050426 received an International Search and Written Opinion Report, dated Jul. 21, 2017, 16 pages.
Related PCT application AU2017/050426 received an International Preliminary Report on Patentability, dated Apr. 20, 2018, 17 pages.
European Search Report for 17795186 dated Oct. 30, 2019, all pages.

* cited by examiner

100

103

300

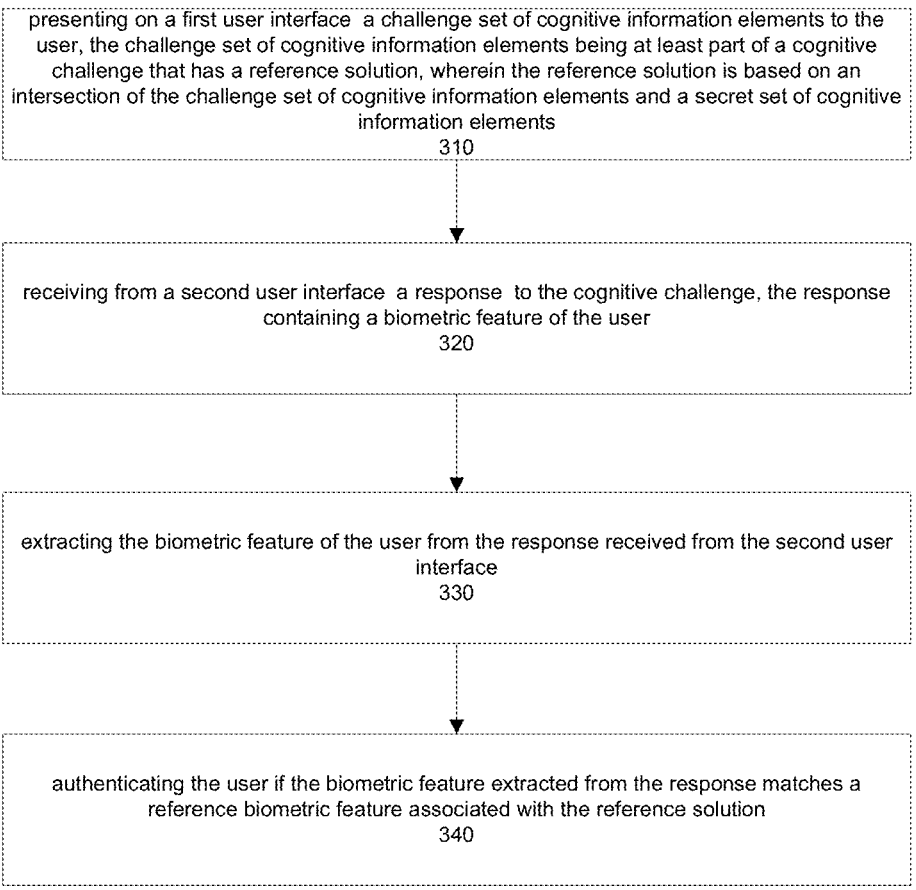

presenting on a first user interface a challenge set of cognitive information elements to the user, the challenge set of cognitive information elements being at least part of a cognitive challenge that has a reference solution, wherein the reference solution is based on an intersection of the challenge set of cognitive information elements and a secret set of cognitive information elements
310 receiving from a second user interface a response to the cognitive challenge, the response containing a biometric feature of the user
320 extracting the biometric feature of the user from the response received from the second user interface
330 authenticating the user if the biometric feature extracted from the response matches a reference biometric feature associated with the reference solution
340

| User Name | CIE | Operation | Reference Solution | Reference Feature |
|---|---|---|---|---|
| John Smith | {designated CIEs}, {undesignated CIEs} | Add and Mod 5 | {0, 1, 2, 3, 4} | {John0, John1, John2, John3, John4} |
| Lisa Jones | {designated CIEs}, {undesignated CIEs} | Multiply and Mod 4 | {0, 1, 2, 3} | {Lisa0, Lisa1, Lisa2, Lisa3} |
| Mike Lee | {designated CIEs}, {undesignated CIEs} | Multiply and Mod 3 | {0, 1, 2} | {Mike0, Mike1, Mike2} |

AUTHENTICATING A USER

CROSS-REFERENCE TO RELATED APPLICATIONS

The present application claims priority from Australian Provisional Patent Application No 2016901727 filed on 10 May 2016, the content of which is incorporated herein by reference.

TECHNICAL FIELD

The present disclosure includes computer-implemented methods, software, and computer systems for authenticating a user.

BACKGROUND

User authentication plays an increasingly important role in a digital era since more and more transactions are being and will be conducted online without physical presence of a user at a transaction location. It should be noted that the term "authentication" in the present disclosure refers to a technical mechanism that uses a technical means to allow a legitimate user to access and prevents an illegitimate user from accessing a service that should only be accessed by the legitimate user. The technical means used in the authentication may take different forms.

For example, instead of walking into a branch of a bank in person, a user may create an account in a database operated by the bank, and associate a password with the account. The account is typically identified by an account name. By providing the account name and the password via a computer at home, the user invokes a password check process using network and digital technologies adopted by the bank. Once the user is authenticated by the password check process, the user is able to transact using the account, for example, making a payment, transferring money to another account held by another user, etc. In addition to banking services, user authentication may be required in document access services. For example, if a user attempts to access a document stored at a secure document server. The secure document server or a third-party security service provider may need to check if the user has the right to access the document. If the user has the right to access the document, the user is authenticated to access the document. Otherwise, the secure document server rejects the user by not allowing the access to the document.

The convenience makes our life easier, however, on the other hand, also increases risk. Particularly, an attacker or a hacker may be able to use hacking technologies to track the account name and the password set by the user when the user is typing the account name and the password on a computer at home. The attacker can even obtain the account name and the password by simply observing the user if the user is logging into the account using a computer installed at a public place.

Different authentication mechanisms have been developed to enhance online security, for example, a cognitive challenge mechanism and a biometric feature mechanism. However, in order to achieve a robust security level, the cognitive challenge mechanism has to be repeated many times with different cognitive challenges when a user logs in the account. This makes the cognitive challenge mechanism inefficient and not user-friendly. On the other hand, the biometric feature mechanism takes advantage of unique biometric features (for example, unique handwriting habits, gestures, etc.) of a user to reduce the number of repetitions, however, this mechanism is vulnerable to noise and imitations due to lack of randomness. This makes the biometric feature mechanism less reliable, particularly, due to the high Equal Error Rate (EER).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present disclosure is not to be taken as an admission that any or all of these matters form part of the prior art base or were common general knowledge in the field relevant to the present disclosure as it existed before the priority date of each claim of this application.

SUMMARY

There is provided a computer implemented method for authenticating a user, the method comprising:

presenting on a first user interface a challenge set of cognitive information elements to the user, the challenge set of cognitive information elements being at least part of a cognitive challenge that has a reference solution, wherein the reference solution is based on an intersection of the challenge set of cognitive information elements and a secret set of cognitive information elements;

receiving from a second user interface a response to the cognitive challenge, the response containing a biometric feature of the user;

extracting the biometric feature of the user from the response received from the second user interface; and authenticating the user if the biometric feature extracted from the response matches a reference biometric feature associated with the reference solution.

As can be seen from the above, the method disclosed in the present disclosure extracts the biometric feature of the user from the response made by the user to the cognitive challenge, and authenticates the user if the biometric feature extracted from the response matches the reference biometric feature. Advantageously, in authenticating the user, this method takes advantage of both cognitive capacities of the user used to determine the reference solution to the cognitive challenge and the biometric feature of the user contained in the response to the cognitive challenge. This method effectively reduces the number of repetitions required in conventional cognitive authentication methods to achieve a desired level of security and improves accuracy of conventional biometric feature authentication methods.

The reference solution may comprise a result of an operation based on the intersection of the challenge set of cognitive information elements and the secret set of cognitive information elements.

The reference solution may be based on an arrangement of the challenge set of cognitive information elements.

The reference solution may be a first reference solution and the response may be a first response, the method further comprising: presenting a second cognitive challenge that has a second reference solution, receiving a second response, extracting the biometric feature from the second response and authenticating the user if the biometric feature extracted from the first response and the second response match the reference biometric feature associated with the first reference solution and second reference solution.

The first user interface may be a screen. Presenting on the first user interface the challenge set of cognitive information elements may comprise presenting on the screen a set of images and presenting a set of numbers associated with the set of images.

The set of images may comprise a first subset that represents the intersection that includes zero, one or more images of the secret set of cognitive information elements; and a second subset including one or more images that are all not in the secret set of cognitive information elements.

The first subset may include one or more images of the secret set of cognitive information elements. It should be noted that it is possible that the first subset may include none of the images that have been designated by the user as the secret set of cognitive information elements during the registration process. Authenticating the user may further comprise:

determining one or more numbers in the set of numbers associated with the first subset;

determining an operation to be performed on the one or more numbers;

performing the operation on the one or more numbers to determine the reference solution to the cognitive challenge; and determining the reference biometric feature based on the reference solution.

Authenticating the user may further comprise:

determining a further reference biometric feature based on the biometric feature and a criterion;

determining a further reference solution to the cognitive challenge, the further reference solution being associated with the further reference biometric feature; and determining the biometric feature extracted from the response matches the reference biometric feature associated with the reference solution if the further reference solution is equal to the reference solution.

The method may further comprise:

determining, based on the criterion, a distance between the biometric feature extracted from the response and the reference biometric feature associated with the reference solution; and determining the biometric feature extracted from the response matches the reference biometric feature associated with the reference solution if the distance meets a threshold.

The response may comprise a set of data indicative of the user interacting with the second user interface.

Extracting the biometric feature may comprise extracting the biometric feature from the set of data.

The second user interface may be the screen and the screen may include a touch-sensitive surface. The set of data may comprise one or more of the following:

a graphical symbol drawn by the user using a tool on the touch-sensitive surface, the graphical symbol including a plurality of points;

a spatial relationship between the plurality of points of the graphical symbol;

a temporal relationship between the plurality of points of the graphical symbol;

a pressure the user imposed on the touch-sensitive surface through the tool;

a position of the tool;

a movement direction of the tool;

a velocity of the tool;

an acceleration of the tool;

a boundary of the graphical symbol;

a width of the graphical symbol;

a height of the graphical symbol; and an area of the graphical symbol.

The second user interface may comprise one or more of an accelerometer, a gyroscope, and a gesture-sensitive device. The set of data may comprise one or more readings from the second user interface.

There is provided a computer implemented method for registering a user to authenticate the user, the method comprising:

receiving from a third user interface a selection of cognitive information elements designated by the user as a secret set of cognitive information elements;

determining reference biometric feature of the user based on the interaction of the user with the third user interface; and storing in a storage device the biometric feature.

The third user interface may be a screen, and presenting on the third user interface the set of cognitive information elements may comprise presenting on the screen a set of images.

The third user interface may be the screen, and the screen may include a touch-sensitive surface. The interaction with the third user interface may comprise one or more of the following:

a graphical symbol drawn by the user using a tool on the touch-sensitive surface, the graphical symbol including a plurality of points;

a spatial relationship between the plurality of points of the graphical symbol;

a temporal relationship between the plurality of points of the graphical symbol;

a pressure the user imposed on the touch-sensitive surface through the tool;

a position of the tool;

a movement direction of the tool;

a velocity of the tool;

an acceleration of the tool;

a boundary of the graphical symbol;

a width of the graphical symbol;

a height of the graphical symbol; and an area of the graphical symbol.

The third user interface may comprise one or more of an accelerometer, a gyroscope, and a gesture sensitive device.

The method may further comprise presenting on the third user interface a further indication to the user indicative of an operation that is used in the cognitive challenge.

There is provided a computer software program, including machine-readable instructions, when executed by a processor, causes the processor to perform one or more of the methods as described above.

There is provided a computing device for authenticating a user, the computer system comprising:

a first user interface;

a second user interface; and a processor that is connected to the first user interface and the second interface, the processor being configured to present on the first user interface a challenge set of cognitive information elements to the user, the challenge set of cognitive information elements being at least part of a cognitive challenge that has a reference solution, wherein the reference solution is based on an intersection of the challenge set of cognitive information elements and a secret set of cognitive information elements;

receive from the second user interface a response to the cognitive challenge, the response containing a biometric feature of the user;

extract the biometric feature of the user from the response received from the second user interface; and authenticate the user if the biometric feature extracted from the response matches a reference biometric feature associated with the reference solution.

BRIEF DESCRIPTION OF DRAWINGS

Features of the present disclosure are illustrated by way of non-limiting examples, and like numerals indicate like elements, in which:

FIG. 3 illustrates an example method for authenticating a user in accordance with the present disclosure;

FIG. 5 illustrates an example table used in the present disclosure to authenticate a user;

DESCRIPTION OF EMBODIMENTS

Figure 1:
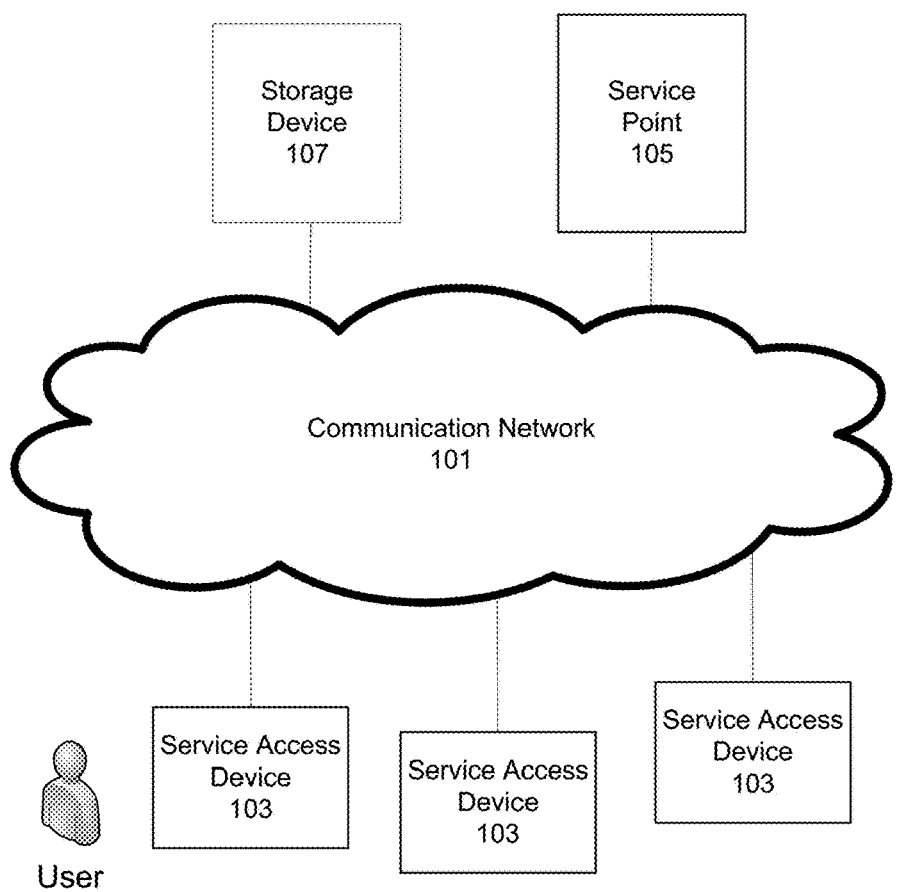
FIG. 1 illustrates an online transaction system in which methods disclosed in the present disclosure are applied.

FIG. 1 illustrates an online transaction system 100 in which methods disclosed in the present disclosure are applied.

The online transaction system 100 as shown in FIG. 1 includes a communication network 101, one or more service access devices 103, a service point 105, and a storage device 107. The communication network 101 may be any suitable networks, such as a wireline network, a cellular network, a wireless local area network (WLAN), an optical network, etc. The communication network 101 may also be a combination of the suitable networks.

The communication network 101 communicates data between network elements in the online transaction system 100. The data communicated over the communication network 101 includes images, numbers, video, voice, text, animation, icons, avatar, electronic form data, or other computer data. Further, the data may also include signalling data that controls operation of the network elements in the online transaction system 100.

The service point 105 is a computing device that provides services to an authenticated user. For example, the service point 105 is a server operated by a service provider (e.g., a bank) to provide banking services (for example, online fund transfer) to a customer of the bank once the customer is authenticated by a service access device 103. Although the storage device 107 and the service point 105 are shown as separate elements in FIG. 1, the storage device 107 may be part of the service point 105 in other examples.

The service access device 103 is a computing device that is operated by the service provider (for example, a bank) or a third-party authentication network to authenticate a user when the user attempts to conduct a transaction with the service point 105. The transaction may include accessing services provided by the service point 105, accessing documents stored at the service point 105, etc. For example, the service access device 103 is a computing device with one or more user interfaces as described in the present disclosure with reference to FIG. 2. One of the methods described in the present disclosure can be implemented as a computer program product in the computing device, and the computing device performs the one or more methods. Further, the service access device 103 can be implemented as part of other devices operated by the service provider. For example, the service access device 103 can be part of an Automated Teller Machine (ATM) operated by a bank.

Figure 2:
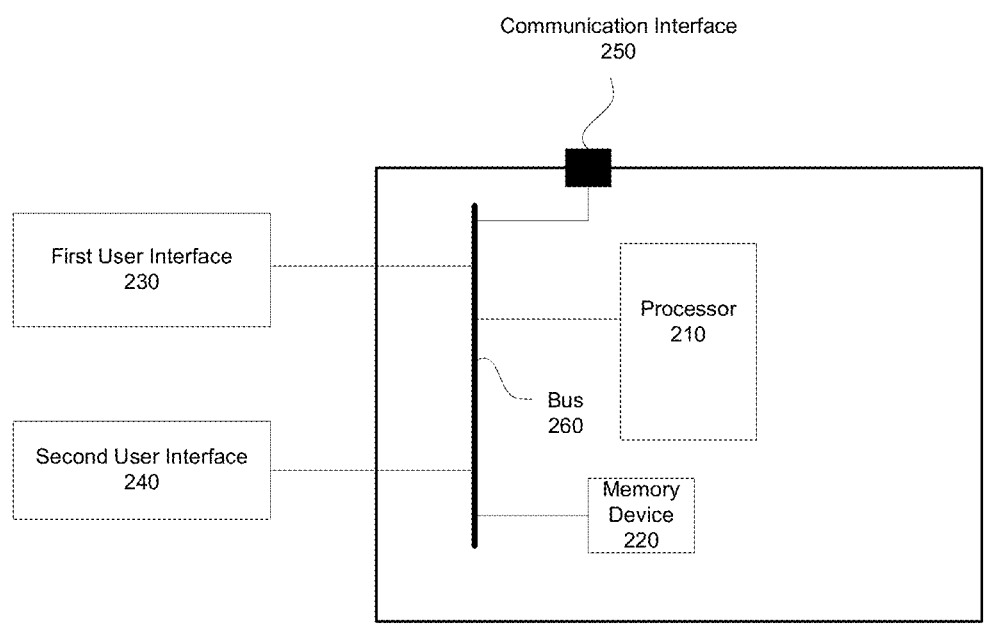
FIG. 2 illustrates an example service access device in accordance with the present disclosure.

FIG. 2 illustrates an example service access device 103 in accordance with the present disclosure. As described above, the service access device 103 is a computing device used to authenticate a user when the user accesses the services provided by the service point 105.

The service access device 103 shown in FIG. 2 includes a processor 210, a memory device 220, a first user interface 230, a second user interface 240, a communication interface 250 and a bus 260. The processor 210, the memory device 220, the first user interface 230, the second user interface 240, and the communication interface 250 are connected via the bus 260 to communicate with each other. The communication interface 250 of the service access device 103 is used to connect the service access device 103 to the communication network 101 and further to the service point 105, as shown in FIG. 1. The communication interface 250 may be an Internet interface, a WLAN interface, a cellular telephone network interface, a Public Switch Telephone Network (PSTN) interface, and an optical communication network interface, or any other suitable communication interface. In other examples, if the service access device 103 is part of the service point 105, the communication interface 250 may not be included in the service access device 103.

The first user interface 230 and the second user interface 240 of the service access device 103 can be a same user interface or different user interfaces. In an example, the first user interface 230 is a screen, and the processor 210 presents visual information (for example, images, numbers, text, animations, video, etc.) on the screen to the user. If the screen includes a touch-sensitive surface, the second user interface 240 can also be the screen. In this case, the processor 210 receives from the screen a set of data. For example, the set of data may represent a response to a cognitive challenge indicative of the user interacting with the second user interface 240, specifically, the touch-sensitive surface. Therefore, the set of data is indicative of biometric features of the user. The set of data comprises a graphical symbol drawn by the user using a tool on the touch-sensitive surface, the graphical symbol including a plurality of points. Particularly, the user can use a finger or a stylus pen to draw the graphical symbol on the screen. The set of data may also comprise:

a spatial relationship between the plurality of points of the graphical symbol;

a temporal relationship between the plurality of points of the graphical symbol;

a pressure the user imposed on the touch-sensitive surface through the tool;

a position of the tool;

a movement direction of the tool;

a velocity of the tool;

an acceleration of the tool;

a boundary of the graphical symbol;

a width of the graphical symbol;

a height of the graphical symbol; and an area of the graphical symbol.

In another example, the first user interface 230 is a screen to present visual information to the user, while the second user interface 240 is a gesture-sensitive device. The gesture-sensitive device may include one or more sensors, for example, a accelerometer and a gyroscope. In this case, the processor 210 receives from the gesture-sensitive device a set of data (i.e., a gesture indication) indicative of a gesture of the user sensed by the gesture-sensitive device. In this case, the set of data comprises one or more readings from the accelerometer or the gyroscope of the gesture-sensitive device.

The processor 210 is configured to perform machine executable instructions stored in the memory device 220 to implement one or more methods described in the present disclosure with reference to the accompanied drawings. The machine executable instructions are included in a computer software program. The computer software program resides in the memory device 220 in this example. In other examples, the computer software program is stored in a computer readable medium that is not part of the service access device 103, and is read into the memory device 220 from the computer readable medium.

The authentication methods described in the present disclosure include an authentication process and a registration process, the processor 210 of the service access device 103 is configured to perform both the authentication process and the registration process. The authentication process is performed when a user logs in the online transaction system 100 using the service access device 103 to access services provided by the service point 105. The registration process is performed when the user registers with the online transaction system 100 using the service access device 103.

Specifically, the processor 210 is configured to perform the method steps in relation to the authentication process, shown in FIG. 3 and discussed in further detail below:

present on the first user interface 230 a set of cognitive information elements to the user, the set of cognitive information elements being at least part of a cognitive challenge that has a reference solution;

receive from the second user interface 240 a response to the cognitive challenge, the response containing a biometric feature of the user;

extract the biometric feature of the user from the response received from the second user interface 240; and authenticate the user if the biometric feature extracted from the response matches the a reference biometric feature associated with the reference solution.

The processor 210 is also configured to perform the method steps in relation to the registration process, shown in FIG. 6 and discussed in further detail below:

present on the first user interface 230 a set of cognitive information elements to the user, the set of cognitive information elements being at least part of a cognitive challenge that has a solution;

receive from the second user interface 240 a set of indications indicative of a first subset of the set of cognitive information elements that is designated by the user;

receive from the second user interface 240 an indication indicative of the solution to the cognitive challenge, the indication containing a biometric feature of the user;

extract the biometric feature of the user from the indication indicative of the solution to the cognitive challenge; and cause the biometric feature to be stored in a storage device 107 in association with the solution to the cognitive challenge.

The processor 210 is also configured to perform the other methods described in the present disclosure.

Authentication Process

FIG. 3 illustrates an example method 300 for authenticating a user in accordance with the present disclosure, particularly, when the user logs in the online transaction system 100 at the service access devices 103 to access services provided by the service point 105. Although method 300 in this example is implemented at the service access device 103, method 300 can also be implemented at the service point 105 if the service access device 103 is part of the service point 105 or the service point 105 also performs user authentication functions in addition to providing services to the user. As another example, method 300 is implemented at a separate authentication server (not shown in FIG. 1) to reduce the computing burden of the service access point 103. Method 300 may also include one or more other steps that are not shown in FIG. 3.

In this example, the service access device 103 includes a screen with a touch-sensitive surface. The screen is used to present visual information to the user, and on the other hand, to receive a response from the user via the touch-sensitive surface. Therefore, both references to the first user interface 230 or and references to the second user interface 250 in this example refer to the one screen with the touch-sensitive surface.

Figure 4C:
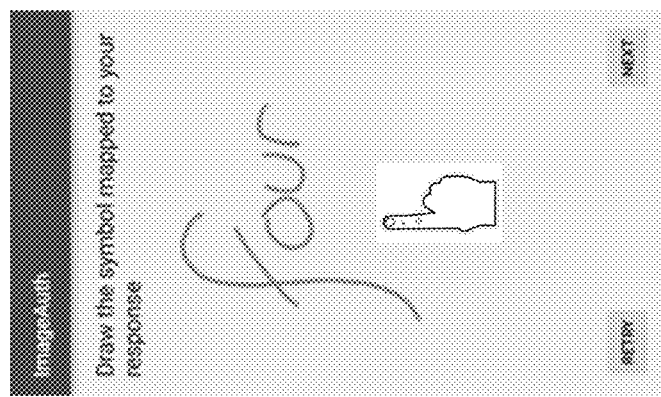
FIGS. 4(a) to 4(c) illustrate screenshots of an example authentication process in accordance with the present disclosure.
Figure 4B:
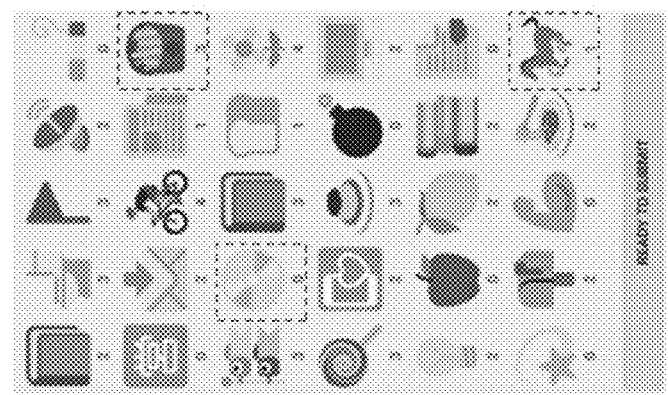
Figure 4A:
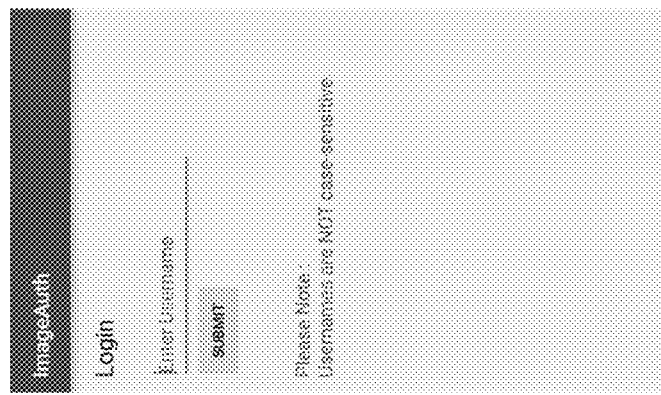

FIGS. 4(a) and 4(b) illustrate screenshots 400 of the authentication process in accordance with the present disclosure.

As show in FIG. 4(a), the user is prompted to provide a user name. The user touches the "Enter Username" text box on the screen, and a virtual keyboard is further presented on the screen. The user enters a username "John Smith" using the virtual keyboard. The user name has been registered by the user with the online transaction system 100 during a registration process described in the present disclosure.

Upon receipt of the username "John Smith" from the screen, method 300 presents 310 on the screen a set of cognitive information elements to the user, as shown in FIG. 4(b). The set of cognitive information elements is at least part of a cognitive challenge that has a reference solution. Particularly, method 300 renders a set of images and a set of numbers (or weights) associated with the set of images, for example, the numbers below the images. The set of images comprises a first subset including one or more images that have been designated by the user during the registration process; and a second subset including one or more images that have not been designated by the user during the registration process. It should be noted that it is possible that the first subset may include none of the images that have been designated by the user during the registration process.

A cognitive challenge is a form of challenge-response authentication. In challenge-response authentication, the system presents a challenge that invites a user to participate in a test that if the user passes proves the user is in fact the person that the user is claiming to be. The challenge may be a question where the user must provide a valid answer. Typically a challenge-response requires the existence of a shared secret which is known to both the user and the system. As an example of a very basic challenge-response, the secret may be the user's favourite number which can be acquired and stored during the registration process. During authentication, the system may challenge the user to respond with the user's favourite number and the system can receive the user's answer to authenticate the user. In this case, authentication would occur if the system determines that the answer is the same as a previously stored favourite number.

In a normal challenge-response authentication system, the user's answer (such as, say 6) is actually the secret and this would be observable to an over-the-shoulder type of attack or even a Man-In-The-Middle type attack. That is, an attacker may either visibly see the answer to the challenge and hence be able to replicate the secret, or the attacker could intercept the answer containing the favourite number (the secret) and use it to pretend to be the user.

A cognitive challenge is a challenge that is presented in a way such that the reference solution conceals the secret. The present disclosure uses the term conceal to mean that the reference solution hides or obfuscates the secret such that the secret is not observable (generally such observations would be performed by an attacker in order to gain access to the system) or such that the secret is difficult to discern from the observable input from the user (where the information about the secret that can be ascertained from the input of a user is limited). This means that the secret itself is not input by the user but there is some form of transformation that is derived from the secret. Typically the challenge will be presented such that it would be difficult or computationally infeasible to observe the secret or ascertain sufficient information about the secret so as to gain access to the system without proper authentication.

The secrets in the present disclosure are described in terms of cognitive information elements. The cognitive information elements are used by the system to construct and present a cognitive challenge in such a way that the secret is concealed. Examples of cognitive information elements may be sets of images but there could be others such as sets of words, colours, numbers or any other object that a user may be able to recognise and designate.

The presents disclosure refers to a challenge set of cognitive information elements which are those elements that are displayed or communicated to a user when attempting an authentication process. As above, the challenge set of cognitive information elements are typically a set of images or icons which the user is able to recognise and identify quickly and easily. This set of challenge cognitive information elements includes elements of the secret set of cognitive information elements, which are those elements the user has selected during the registration process to be secret and the knowledge of which is the criteria for future authentication.

There are many forms of cognitive challenges, and the challenge does not need to be a literal question and may be any form of challenge that requires a user to respond. One form of cognitive challenge may be a recognition type challenge where, for example, the user is challenged to identify images that belong to a user designated set of images out of a larger set of images that are displayed. The secret for the purpose of authentication in this case may be the full set of user designated images. Of course, if the system merely asked the user to select the images by interacting with the touch screen, then the secret set of images could be easily identified by an attacker. This in itself would not be observation resistant because the attacker could simply view the user selecting each of the individual images.

The reference solution is based on an intersection of the secret set of cognitive information elements and the challenge set of cognitive information elements. The reference solution may be simply the sum of the numbers associated with the cognitive information elements in the intersection. The reference solution may be just a number in itself. For example, if "fried chips" was the only cognitive information element that is presented in the challenge set of cognitive information elements, then the reference solution may just be "3." This may provide some level of security because there may be multiple ways in the challenge set by which the answer could be "3."

There is also the possibility that the intersection of the secret set of cognitive information elements and the challenge set of cognitive information elements is empty. That is, there are no elements of the secret set of cognitive information elements presented as part of the challenge set. There are numerous ways in which this scenario could be handled, but one way is for the system to accept any answer from the user. This adds a degree of unpredictability to any observer because the response is not based on any of the images presented in the challenge set. This therefore makes it more difficult for an attacker who is observing a user's authentication over multiple attempts.

In order to authenticate the user as part of the authentication process in the above example, the user observes a challenge set of cognitive information elements (in this case a set of images) presented on the screen, and recognises the one or more images that have been designated by the user during the registration process (the secret set of cognitive information elements) using his or her cognitive capabilities, for example, images ("fried chips", "optical disk", and "horse") in the dashed boxes in FIG. 4(b). That is, the images ("fried chips", "optical disk" and "horse") are the intersection of the challenge set of cognitive information elements and the secret set of cognitive information elements as they are the only elements that are common to both sets. It should be noted that the dashed boxes are shown in FIG. 4(b) for description purpose only, and these dashed boxes are actually not presented on the screen. Further, the user reads, using his or her cognitive capacities, the numbers (as groupings or weights) associated with the designated images, for example, numbers below these designated images (i.e., number "3" below "fried chips", number "0" below "optical disk" and number "1" below "horse").

The recognition of cognitive information elements may form the cognitive challenge itself or it may form part of the cognitive challenge. For example, in the example shown in FIG. 4(D) the challenge set of cognitive information elements can be divided into four quadrants (410, 420, 430 and 440). There can be more or less divisions, and four is just used for illustrative purposes here. The challenge set of cognitive information elements may contain some of the secret set of cognitive information elements which the present disclosure refers to as an intersection. If the secret set of cognitive information elements were as follows: "cyclist", "flag", "optical disk", "fried chips", "flower", and "horse", then the cognitive challenge may be to identify the number of secret cognitive information elements in each of the four quadrants. In this case, there would be three in the quadrant 410, two in quadrant 420, zero in quadrant 430 and one in quadrant 440.

One form of reference solution for the cognitive challenge could be based on identifying the quadrant with the highest or lowest number of secret images ("top left" and "bottom left" respectively). A more complex challenge could be to require the user to write the number of images in order from top left to bottom right (in this case, 3201) but this may reveal some information about the secret images. Alternatively the reference solution could be to order the quadrants by the number of secret images in that quadrant. In this example, where the number 1 to 4 each corresponds to the quadrant from top left 410 to bottom right 440, the order of the quadrants could be written "3421" if sorted from the lowest number of secret images (bottom left 430) to highest number of images (top left 410). The quadrants do not have to be numbers, for if the quadrants were correspondingly labelled A to D, the order of the quadrants would be written "CDBA" in this example. As a result, the secret set of images are concealed because the reference solution "CDBA" does not observably contain the secret set of images. While some information may be inferred from an observer who observes the user, this would typically only be useful after multiple responses. A robust system would require an attacker to observe so many responses that it would be infeasible to do so to gain access.

The cognitive challenge may require the user to perform an operation on the numbers associated with each image such that the secret itself (that is in this case the secret set of user designated images) would not be observable. As with the example described above, the cognitive challenge not only requires recognition of user designated secret set of images, but also requires the user to perform an operation (such as a sum) on the numbers associated with the images. If there were, say, ten images that were designated during the registration process, then each challenge may only present as part of the challenge set of images, a subset of images (say three images) along with other images that may not be elements of the user designated secret set of images. This means that the user has to identify the elements that are elements of their secret set of images in order to be authenticated by the system but the reference solution is based on an operation performed on the numbers associated with the secret set of images so as to conceal the secret set of images itself.

A person skilled in the art would appreciate there are many different ways in which a cognitive challenge can be framed such that the reference solution conceals the secret set of cognitive information elements. Iit would be understood that given the reference solution conceals the secret, the secret (the secret set of cognitive information elements) is not observable from the response that is required from the user for authentication. Further, the reference solution conceals the secret due to the intersection of the challenge set of cognitive information elements and the secret set of cognitive information elements. That is a user would not be able be authenticated unless the user has knowledge of the secret set of cognitive information elements and is therefore able to distinguish between the cognitive information elements that are part of the intersection and those cognitive information elements that are not part of the intersection.

In this case, one approach to conceal the secret so that an attacker would not be able to observe the secret (in this example the user designated secret set of images) and secure the system is to determine the numbers associated with the images in the challenge set such that reference solution could be obtained from the operation on the numbers associated with the images in multiple ways. To explain this in more detail, the cognitive challenge in this example is "what is the result of the operation (sum of the numbers associated with the designated images) modulo 5?". The operation may be displayed to the user as part of the cognitive challenge, or it may not, but in this case, this operation is known to the user before logging in the online transaction system 100. Subsequently, the user performs an modulo 5 operation on the sum of the numbers (i.e., "3", "0" and "1"), particularly, (3+0+1) mod 5. The result of this operation is number "4". Typically, in a robust presentation of a cognitive challenge, there should be multiple different combinations of images that could have resulted in the number "4" and therefore the operation on the numbers associated with the challenge set of images has multiple solutions. At the same time, security could be enhanced by providing a sufficiently large number of combinations of images such that the reference solution is not simply guessable by chance. This way the use of a cognitive challenge makes it difficult or computationally infeasible to determine the secret as the response from the user reveals little about the secret. Even though an attacker might be able to observe the answer "4" the attacker would not have sufficient information to determine what the images are that resulted in the answer "4." Hence the secret (in this case the images) remains concealed by the reference solution and the response from the user.

Once the cognitive challenge has been presented, the user draws a graphical symbol as a response to the cognitive challenge. In the example relating to FIG. 4(C), the user, using a tool (e.g., a finger or a stylus pen), writes down an English word "four" on the touch-sensitive surface of the screen. Since the graphical symbol "four" is drawn by the user, the graphical symbol "four" contains a biometric feature of the user.

Method 300 receives 320 the response to the cognitive challenge, particularly, the graphical symbol, from the screen via the touch-sensitive surface and extracts 330 the biometric feature of the user form the response received. Method 300 further authenticates 340 the user if the biometric feature extracted from the response matches a reference biometric feature associated with the reference solution.

The reference biometric feature is a feature extracted from one or more training responses (for example, images) that were drawn by the user during the registration process. In this example, the one or more training images represent the English word "four". On the other hand, if the biometric feature extracted from the response does not match the reference biometric feature, method 300 denies the access to the services provided by the service point 105 by for example presenting an error message on the screen, or sending a reject message via email or Short Message Service (SMS) to the user.

In this example, clearly, the reference solution to the cognitive challenge is number "4". To access the services provided by the service point 105, the user is not only required to determine the reference numerical solution "4" using his or her cognitive capacities, but also required to draw the graphical symbol containing the biometrical feature that matches the reference biometric feature.

Figure 4E:
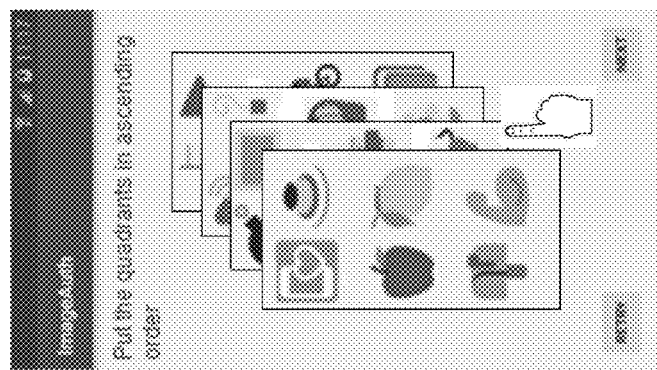
FIGS. 4(d) and 4(e) illustrates screenshots of an alternative example authentication process in accordance with the present disclosure.
Figure 4D:
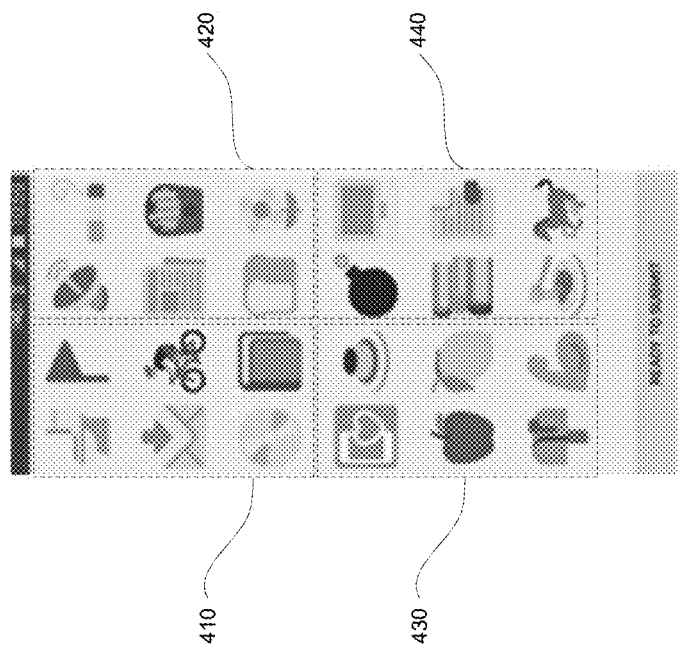

Alternative cognitive challenges may utilise different reference biometric features to those described above in relation to the user drawing the word "four". In the example referring to FIG. 4(D), the reference solution to the cognitive challenge is the arrangement of the quadrants 410, 420, 430 and 440 into ascending order. FIG. 4(E) represents the quadrants when arranged in ascending order where the order is determined by counting the number of secret cognitive information elements in each quadrant. In this example the user has placed the quadrants from front to back in the following order: 430, 440, 420, 410.

The system may accept different forms of input from the user so as to allow a response from the user to perform this arrangement. For example, the system may utilise a swipe type interaction from the user on the screen with a touch sensitive interface. In this case, the user may drag the quadrants using their finger or stylus to place them in their appropriate position. The reference biometric features therefore can be based on the swipe that the user performs while ordering the quadrants. During the training responses, the system may require the user to swipe to perform one or more training arrangements so that biometric features of the swipe can be extracted. Similarly, if the biometric feature extracted from the response (in this case the arrangement of the quadrants) matches a reference biometric feature associated with the reference solution, then the method 340 will authenticate the user.

To enhance security, a different cognitive challenge may be presented to the user on the screen each time the user logs in the online transaction system 100. As a result, the reference solution to the cognitive challenge may be different, and the reference biometric feature used to match the biometric feature extracted from the response may also be different accordingly. Therefore, in order for the service access device 103 to authenticate user, the reference biometric feature needs to be determined. In order to further enhance security, a different cognitive challenge may be presented to the user on the screen that requires a second response from the user. As a result, the second reference solution to the second cognitive challenge may be different to the first reference solution to the first cognitive challenge and therefore the additional response may be different from the response provided by the user in the first cognitive challenge. Therefore it would be more difficult for an attacker to guess. This second response may be required where the system is insufficiently certain about the authentication of the user after the first response.

In one embodiment, when constructing the cognitive challenge to be presented on the screen, method 300 determines the first subset including the one or more images ("fried chips", "optical disk", and "horse") that have been designated by the user. That is, the first subset of images are elements of the secret set of images that the user designated during registration. There are also one or more numbers (for example, "3", "0" and "1") associated with the first subset of images. Therefore, the one or more numbers (for example, "3", "0" and "1") associated with the first subset of images are known to method 300 in determining the reference biometric feature. Method 300 further determines an operation to be performed on the one or more numbers according to the cognitive challenge, i.e., (sum of the numbers associated with the designated images) modulo 5. The operation is stored in association with the user in the storage device 107 (for example, the operation is stored in associated with the user in a table stored in the storage device 107, as described in detail with reference to FIG. 5). Therefore, method 300 determines the operation by accessing the storage device 107. Method 300 performs the operation on the one or more numbers (particularly, (3+0+1) mod 5 in this example) to determine the reference solution (i.e., the numerical reference solution "4") to the cognitive challenge. Method 300 further determines the reference biometric feature based on the reference solution.

FIG. 5 is an example table 500 used in the present disclosure to authenticate the user. The table 500 is stored in the storage device 107 and is used in both the authentication process and the registration process.

The table 500 include a "user name" field 512, a challenge information element ("CIE") field 514, an "operation" field 516, a "reference solution" field 518, and a "reference feature" field 520. Each entry of the table 500 associates the user name of a user with the challenge information elements used to construct the cognitive challenge, the operation used to solve the cognitive challenge, possible reference solutions to the cognitive challenge, and corresponding reference biometric features. The table 500 may take a different form in other examples without departing from the scope of the present disclosure.

Take the first entry of the table 500 as an example, the "user name" field 512 contains an identification of the user, which can simply be the name of the user, for example, "John Smith". When the user logs in the online transaction system 100 by providing the use name "John Smith", method 300 locates the entry that is identified by "John Smith", i.e., the first entry of the table 500. Method 300 then retrieves challenge information elements (CIE) from the "CIE" field 514 of the first entry of the table 500.

The "CIE" field 514 contains challenge information elements (for example, images, or identifiers of the cognitive information elements) that are used to construct the cognitive challenge. The challenge information elements include a first set of challenge information elements that have been designated by the user during the registration process and a second set of challenge information elements that have not been designated during the registration process. The "CIE" field 514 may also contain a set of numbers (or weights) associated with challenge information elements. The set of numbers can be pre-determined. However, the set of numbers may also be determined in a random manner or based on a certain function when the cognitive challenge is presented to the use on the screen.

In this example, method 300 selects one or more of designated challenge information elements and one or more of the undesignated challenge information elements from the challenge information elements contained in the "CIE" field 514, determines the numbers (weights) associated with the selected challenge information elements to construct the cognitive challenge. As shown in FIG. 4(b), the selected challenge information elements that have been designated by the user during the registration process include images "fried chips", "optical disk", and "horse", and the numbers (or weights) associated with these designated challenge information elements are numbers "3", "0", and "1", respectively.

The "operation" field 516 contains the operation used to solve the cognitive challenge. As indicated in the "operation" field 516 of the first entry of the table 500, method 300 determines that the operation "Add and Mod 5" is used to solve the cognitive challenge presented to the user identified by "John Smith". The operation "Add and Mod 5" is known to the user before the user logs in the online transaction system 100. In other example, method 300 transmit the operation to the user via an email message or a SMS message to remind the user of the operation to solve the cognitive challenge. Method 300 may also present the operation to the user as a text message on the screen.

The "reference solution" field 518 contains possible numerical solutions to the cognitive challenge. As indicated by the "reference solution" field 518 of the first entry of the table 500, the possible numerical solutions to the cognitive challenge include numbers "0", "1", "2", "3", and "4". Method 300 performs the operation "Add and Mod 5" on the numbers "3", "0", and "1", particularly (3+0+1) mod 5, to determine the reference numerical solution "4" to the cognitive challenge shown in FIG. 4(b).

The "reference feature" field 520 contains the biometric features associated with the possible reference solutions contained in the "reference solution" field 518. A reference feature contained in the "reference feature" field 520 is a vector characterising an expected response received from the second user interface 240 of the service access device 103. The vector can be a combination of different types of biometric features. In the table 500, the reference numerical solution "0" is associated with the reference biometric feature identified by "John0", and the reference numerical solution "1" is associated with the reference biometric feature identified by "John1", and so on. The reference biometric features are extracted from one or more training responses (for example, one or more images) that are received from the user during the registration process. For example, the reference biometric feature identified by "John0" that is associated with the reference numerical solution "0" is extracted from one or more English words "zero" written by the user on the touch-sensitive screen using a finger or a stylus pen. For the example shown in FIG. 4(b), since the reference numerical solution is "4", method 300 determines the reference biometric feature identified by "John4" is the reference biometric feature associated with the number "4", as shown in the first entry of the table 500.

As shown in FIG. 4(c), the user determines a solution to the cognitive challenge shown in FIG. 4(b) using his or her cognitive capacities. In this example, the solution determined by the user is the number "4". The user then draws a graphic symbol, particularly an English word "four", on the touch-sensitive screen as a response to the cognitive challenge. The service access point 103 receives the response from the touch-sensitive screen. Upon receipt of the response, method 300 extracts the biometric feature of the user from the English word "four" received from the touch-sensitive screen, which is drawn by the user. If the biometric feature extracted from the English word "four" matches the reference biometric feature identified by "John4", as determined above, method 300 authenticate the user to access services provided by the service point 105.

Biometric Features

To better understand the process of authenticating the user based on the matching between the biometric feature extracted from response and the reference biometric feature, the biometric features that can be used to authenticate the user are described below. It should be noted that other biometric features may also be used without departing from the scope of the present disclosure. It should also be noted that the biometric feature used in authenticating a user in the present disclosure can be a combination of different types of biometric features.

1. Touch Features. These features originate from the touch tool, e.g., user's finger(s) or a stylus pen, interacting with the service access device's 103 touch-sensitive screen.

2. Stylometric Features. These features originate from the way a user draws a symbol, e.g., a word or a sketch, on the service access device's 103 touch-sensitive screen.

3. Device-interaction Features. These features originate from the way the user interacts with the service access device 103 through a medium other than a touch-sensitive surface, e.g., features used for gesture or gait recognition in smart wristbands or recognizing winks in smart glasses. In this case, the second user interface 240 of the the service access device 103 is a gesture or gait sensitive device that includes one or more sensors, for example, an accelerometer and a gyroscope.

In the authentication process, the biometirc feature is extracted 330 from the response provided by the user in response to the cognitive challenge. On the other hand, in the registration process, the biometric feature is extracted as the reference biometric feature from one or more training reponses provided by the user. In either case, the biometric feature is extracted from raw outputs from the touch-sensitive surface of the service access device 103 or other sensors available from the service access device 103. The raw outputs are essentially a set of data indicative of the user interacting with the second user interface 240 of the service access device 103.

The raw outputs are categrised into touch outputs from the touch-sensitive screen and sensor outputs from other sensors of the serivce access device 103.

Values of touch outputs are extracted from the set of data provided by the touch-sensitive screen when the user touches the touch-sensitive screen using a touch tool, for example, a finger or stylus pen.

The touch outputs include one or more of the following parameters: Action type: indicating if the touch tool is making contact with the screen, moving continuously on the screen or if the tool is being lifted from the screen;

$$\text{type} \in \{\text{up}, \text{move}, \text{down}\}$$

X postion x: the x coordinate of the touch tool on the screen;

Y postion y: they coordinate of the touch tool on the screen;

Pressure p: a force from the touch tool being exerted on the screen;

Size s: the footprint area of the touch tool on the screen;

Tilt in X $\tau_x$: the angle the touch tool makes with the screen with the x axis; and Tilt in Y $\tau_y$: the angle the touch tool makes with the screen with the y axis;

Values of sensor outputs are extracted from the set of data provided by the one or more sensors of the second user interface 240, for example, one or more readings from the one or more sensors.

The sensor outputs includes one or more of the following parameters: Rotation Vector: indicating the rotational position of the the second user interface 240 in space, further including:

Rotation Vector x:

$$R_x = x \sin\left(\frac{\theta}{2}\right)$$

Rotation Vector y:

$$R_y = y \sin\left(\frac{\theta}{2}\right)$$

Rotation Vector z:

$$R_z = z \sin\left(\frac{\theta}{2}\right)$$

Scalar of Rotation Vector:

$$|R| = \cos\left(\frac{\theta}{2}\right)$$

Estimated Heading of Rotation Vector $\theta_e$;

Gyroscope vector: a rate of rotation of the second user interface 240 around an axis, further including:

Rotation Vector x: $G_x$
Rotation Vector y: $G_y$
Rotation Vector z: $G_z$

Accelerometer: an acceleration force along an axis due to both the motion and gravity of the second user interface 240, further including:
Rate of rotation around x: $A_x$
Rate of rotation around y: $A_y$
Rate of rotation around z: $A_z$;
Gravity: an acceleration force along an axis due solely to gravity, further including:
Gravity along x: $g_x$
Gravity along y: $g_y$
Gravity along z: $g_z$;
Linear Accelerometer: an acceleration force along an axis due solely to the second user interface's 240 motion, further including:
Linear acceleration along x: $A_{l_x}$
Linear acceleration along y: $A_{l_y}$
Linear acceleration along z: $A_{l_z}$ As described above, method 300 extracts from raw outputs the biometric features. The three categories of biometric features are described in detail below.

Touch Features. For description purposes, a symbol n denotes sample number, and x[n] denotes the value of x in the nth sample. For undefined data points, e.g., for n=0 in x[n−1], the value is assumed to be equal to 0, i.e., x[−1]=0. The symbol δ signifies the change of a value. Touch features include one or more of the following features:

δx: the change in x position of the current data-point from the previous point, $$\delta x[n] = x[n] - x[n-1];$$

$\dot{x}$: the velocity in x direction of the current data-point from the previous point, $$\dot{x}[n] = \frac{x[n] - x[n-1]}{t[n] - t[n-1]}$$
$$\Rightarrow \dot{x}[n] = \frac{\delta x[n]}{\delta t[n]};$$

$\ddot{x}$: the acceleration in x direction of the current data-point from the previous point, $$\ddot{x}[n] = \frac{\dot{x}[n] - \dot{x}[n-1]}{t[n] - t[n-1]}$$
$$\Rightarrow \ddot{x}[n] = \frac{\delta \dot{x}[n]}{\delta t[n]};$$

δy: the change in y position of the current data-point from the previous point, $$\delta y[n] = y[n] - y[n-1];$$

$\dot{y}$: the velocity in y direction of the current data-point from the previous point, $$\dot{y}[n] = \frac{y[n] - y[n-1]}{t[n] - t[n-1]}$$
$$\Rightarrow \dot{y}[n] = \frac{\delta y[n]}{\delta t[n]};$$

$\ddot{y}$: the acceleration in y direction of the current data-point from the previous point.

$$\ddot{y}[n] = \frac{\dot{y}[n] - \dot{y}[n-1]}{t[n] - t[n-1]}$$
$$\Rightarrow \ddot{y}[n] = \frac{\delta \dot{y}[n]}{\delta t[n]};$$

δp: the change in pressure applied to the screen of the current data-point from the previous point, $$\delta p[n] = p[n] - p[n-1];$$

$\dot{p}$: the rate in change in pressure applied to the screen of the current data-point from the previous point, $$\dot{p}[n] = \frac{p[n] - p[n-1]}{t[n] - t[n-1]}$$
$$\Rightarrow \dot{p}[n] = \frac{\delta p[n]}{\delta t[n]};$$

$\ddot{p}$: the rate of the rate in change of pressure applied to the screen of the current data-point from the previous point, $$\ddot{p}[n] = \frac{\dot{p}[n] - \dot{p}[n-1]}{t[n] - t[n-1]}$$
$$\Rightarrow \ddot{p}[n] = \frac{\delta \dot{p}[n]}{\delta t[n]};$$

δs: the change in the size of the touch tool making contact with the screen, $$\delta s[n] = s[n] - s[n-1];$$

$\dot{s}$: the rate in change in size applied to the screen of the current data-point from the previous point, $$\dot{s}[n] = \frac{s[n] - s[n-1]}{t[n] - t[n-1]}$$
$$\Rightarrow \dot{s}[n] = \frac{\delta s[n]}{\delta t[n]};$$

$\ddot{s}$: the rate of the rate in change of size applied to the screen of the current data-point from the previous point, $$\ddot{s}[n] = \frac{\dot{s}[n] - \dot{s}[n-1]}{t[n] - t[n-1]}$$
$$\Rightarrow \ddot{s}[n] = \frac{\delta \dot{s}[n]}{\delta t[n]};$$

$\tau_x$: a raw measure of the angle the touch tool makes with the screen in the x axis. Also known as $\text{tilt}_x$, $\tau_x[n]$;

$\dot{\tau}_x$: the rate in change in the angle of the touch tool to the screen of the current data-point from the previous point, $$\dot{t}_x[n] = \frac{\tau_x[n] - \tau_x[n-1]}{t[n] - t[n-1]};$$

$\ddot{\tau}_x$: the rate of the rate in change of size applied to the screen of the current data-point from the previous point, $$\dot{\tau}_x[n] = \frac{\tau_x[n] - \tau_x[n-1]}{t[n] - t[n-1]};$$

$\tau_y$: a raw measure of the angle the touch tool makes with the screen in the y axis. Otherwise known as tilt$_y$, $\tau_y[n]$;

$\dot{\tau}_y$: the rate in change in the angle of the touch tool to the screen of the current data-point from the previous point, $$\dot{\tau}_y[n] = \frac{\tau_y[n] - \tau_y[n-1]}{t[n] - t[n-1]};$$

$\ddot{\tau}_y$: the rate of the rate in change of size applied to the screen of the current data-point from the previous point, $$\ddot{\tau}_y[n] = \frac{\dot{\tau}_y[n] - \dot{\tau}_y[n-1]}{t[n] - t[n-1]};$$

Force F: the force exerted on the screen by the touch tool. It is proportional to:

$$F[n] = p[n]s[n];$$

Sequence of On Strokes $SS_{on}$: this is a vector containing the directions of continuous strokes when the touch tool is making contact with the screen. It is derived from the $\delta x$ and $\delta y$ positional change of an action of down type until the next action of up type, $$SS_{on}[m] \in \{up, down, left, right\};$$

Sequence of Off Strokes $SS_{off}$: this is a vector containing the directions of continuous strokes when the touch tool is not making contact with the screen. It is derived from the $\delta x$ and $\delta y$ positional change of an action of up type until the next action of down type, $$SS_{off}[m] \in \{up, down, left, right\},$$

Sequence of Strokes—Extension: the previous two Sequence of Strokes features carry time data, in the form of timestamps. This timing aspect can be extrapolated into a vector of equal length as SS with durations of each stroke into Stroke Time (ST[m]). Additionally the possible values of SS can be increased to include more granularity in the directions, $$SS[m] \in \{up, down, left, right, topleft, topright, bottomleft, bottomright\}$$

Stylometric Features. Unlike static stylometrics, the stylometric features can be captured and calculated in realtime. This allows us to utilise how the stylometric features change in time to identify a user. In the present disclosure, the top of the screen is defined as positive y, and the right as positive x. The stylometric features including one or more of the following features:

TMP: the upper most point of the current drawn figure, $$TMP[n] = \max(y) - y[0];$$

BMP: the bottom most point of the current drawn figure, $$BMP[n] = \min(y) - y[0];$$

LMP: the left most point of the current drawn figure, $$LMP[n] = \min(x) - x[0];$$

RMP: the right most point of the current drawn figure, $$RMP[n] = \max(x) - x[0];$$

Margin Extremities Extension: for each of the extreme points, there are also various touch and sensor features parameters at those points in time, $$\{Velocity, Acceleration, Pressure, Tilt, SensorData\};$$

Width: the width of the space occupied by the current drawn figure, $$width[n] = RMP[n] - LMP[n];$$

Height: the height of the space occupied by the current drawn figure, $$height[n] = TMP[n] - BMP[n];$$

Area: the rectangular area currently occupied by the current drawn figure, $$area[n] = width[n]height[n];$$

Width-to-Height Ratio: the width-to-height ratio of the space currently occupied by the current drawn figure, $$ratio[n] = \frac{width[n]}{height[n]};$$

Width, Height—Extension: both these fundamental parameters can be extended to their rate of change and rate in rate of change, $$\dot{height}[n] = \frac{height[n] - height[n-1]}{t[n] - t[n-1]}$$

$$\ddot{height}[n] = \frac{\dot{height}[n] - \dot{height}[n-1]}{t[n] - t[n-1]}$$

$$\dot{width}[n] = \frac{width[n] - width[n-1]}{t[n] - t[n-1]}$$

$$\ddot{width}[n] = \frac{\dot{width}[n] - \dot{width}[n-1]}{t[n] - t[n-1]};$$

Curvature: the amount of curvature at point n as calculated by $$curve[n] = \sqrt{\frac{(\dot{y}[n]\ddot{y}[n] - \dot{x}[n]\ddot{x}[n])^2}{(\dot{y}[n]^2 + \dot{x}[n]^2)^{3/2}}};$$

$\theta_{slope}$: the tangential angle of the current heading between the previous data-point and the current point, $$\theta_{slope}[n] = \arctan\frac{\dot{y}[n]}{\dot{x}[n]};$$

$\theta_{path}$: the angle created by the previous, current and next points, computed with the cosine rule.

$$L_{12} = \sqrt{x[n]^2 - x[n-1]^2}$$

$$L_{13} = \sqrt{x[n]^2 - x[n+1]^2}$$

$$L_{23} = \sqrt{x[n-1]^2 - x[n+1]^2}$$

-continued $$\theta_{path}[n] = \arccos \frac{L_{12}^2 + L_{13}^2 - L_{23}^2}{2L_{12}L_{13}}$$

Device-Interaction Features. The features in this category are the same as the raw sensor outputs except that they are collated into time series.

Some terms are defined here to describe the authentication method in detail. As described above, the authencation method in the present includes two processes, authentication and registration processes between two parties, the prover and the verifier (see reference [1]). The prover is the user U and the verifier is the authentication service S or the service access point 103. The authentication method can be categorized as a symmetric key challenge-response scheme. The term challenge-response means that the authentication process of the authencation method involves challenges from S which U has to respond to.

Since the authentication method in the present disclosure involves cognitive authentication and biometric feature authentication, the cognitive authentication and the biometirc feature authentication are described first separately.

Cognitive Authentication. The cognitive authentication method consists of a secret (password) space S, a challenge space C and a solution space R. The solution space R is finite and we let |R| denote its cardinality. A cognitive function or an operation $f$ maps a challenge $c \in C$ and a password $s \in S$ to a solution $r \in R$, as $f: C \times S \rightarrow R$. The function or operation $f$ is meant to be computed by U using cognitive capacities of U.

S, C, R and $f$ are defined as follows. The password space S consists of a set N of n objects (e.g., images). An individual password $s \in S$ is assumed to be a k-element subset of N. Each element of s is referred to as a pass-object. The challenge space C consists of l-element subsets of N, each element having a weight from the set of integers $\{0, 1, \ldots, d-1\}$. $\{0, 1, \ldots, d-1\}$ is denoted by $Z_d$. More precisely, let $c \in C$ be a challenge. Therefore, each element of c is the pair (i, $\omega_i$), where $i \in [n]$ is an object (e.g., an image) from N and $\omega_i \in Z_d$ is the weight associated with i. Since an element of a c, i.e., an ordered pair, is uniquely determined by the object it represents, we shall refer to it as such. Given $s \in S$ and $c \in C$, we say $s \cap c = \emptyset$, if there is no element in c in common with s. The function $f$ is then defined as $$f(s, c) = \begin{cases} \sum_{i \in s} \omega[i] \bmod d, & \text{if } s \cap c \neq \emptyset \\ r \in Z_d, & \text{if } s \cap c = \emptyset \end{cases}$$

that is to sum up all the weights of the pass-objects in c and return the result of (the sum mod d). If no pass-object is present then return an element from $Z_d$. It follows that the solution space $R = Z_d$ and |R|=d. It should be noted that the above definition of function $f$ is provided here for description purposes, function $f$ can be different in other examples.

Biometric feature Authentication. In a biometric feature-based authentication method, a registration process is performed to extract the reference biometric features of a user. The registrateion process is also referred to a training process. During the registration process a template of a particular behaviour of the user, e.g., handwriting, gesture, or gait, is stored. The template can be either the set of all feature vectors extracted from the samples provided by the user, or one ore more optimal feature vectors (in the case of SVM), or global statistics such as mean and variance. The authentication process (also known as a testing process) in the authentication method consists of S challenging the user U to reproduce the biometric feature that matches the template.

The biometric features used in the present disclosure are extracted from a set of graphical symbols from $\Omega$ sketched by U, where $|\Omega| \geq 2$. Examples of the graphical symbols are words from a language (for example, English words "zero", "one", "two", "three", "four", etc.) or a drawing of real-world objects. During the registration process, S asks U to sketch each symbol $\omega \in \Omega$. From these sketches, S determines a template $\omega_T$ for each $\omega \in \Omega$ and stores the template $\omega_T$. Collectively the templates of all graphical symbols are denoted by T. In the authentication process, S asks U to sketch a symbol $\omega \in \Omega$. U provides $\hat{\omega} \leftarrow \text{sketch}(\omega)$ to S. S runs a classifier $b: T \in \hat{\Omega} \rightarrow \Omega \cup \{\bot\}$, which classifies the user sketch $\hat{\omega} \in \hat{\Omega}$ to a symbol $\omega \in \Omega$ based on the template T. The classifier also outputs $\bot$ if the user sketch $\hat{\omega}$ does not match the template of any symbol $\omega \in \Omega$. The symbol $\bot$ therefore represents "no match found."

Hybrid Authentication. The authentication method provided in the present disclosure also includes a Global Setup process executed by S (i.e., the service access point 103) to set the parameters and classifier used in the authentication method. Once parameters and classifier are set, the registration and authentication processes between S and U can be executed.

A pseudo-code representation of the global setup process is as follows:
1. S sets parameters n, k, l and d. For instance, n=200, k=10, l=30, and d=5.
2. S sets the n objects of the set N.
3. S sets d symbols $\omega \in \Omega$.
4. S sets a one-to-one map $\sigma: R \rightarrow \Omega$, which maps each solution $r \in R$ to a unique symbol $\omega \in \Omega$. Note that |R|=d.
5. S sets the (untrained) classifier b.
6. S sets the number $\tau$, i.e., the number of sketches for each symbol $\omega \in \Omega$ needed to train the classifier b. In other words, $\tau$ is the training size. For instance, $\tau=5$.

A pseudo-code representation of the authentication process is as follows.
1. S randomly selects l elements from N. For each element, S generates a weight from $Z_d$ randomly or in a certain function associated with each element from N.
2. S sends the l-element cognitive challenge c to U whose elements are ordered pairs of objects from N and their weights.
3. U determines using its cognitive capabilities if any object from s is in c. If yes, U sums their weights and performs a mod d operation using its cognitive capacities to determine r as a solution to the cognitive challenge. If no object from s is in c, U determines a random integer $r \in Z_d$ as the solution.
4. U uses the map $\omega \leftarrow \sigma(r)$, to know which symbol co U has to draw.
5. U sends $\hat{\omega} \leftarrow \text{sketch}(\omega)$ to S.
6. S computes $b(T, \hat{\omega})$.
7. if the output is $\bot$ then
8. S sends a reject message to U.
9. else
10. Let $\omega = b(T, \hat{\omega})$. S determines $\hat{r}$ corresponding to co through the inverse map $\sigma^{-1}$.
11. if S finds that c contains at least one object from s then
12. S computes $f(c, s)$ to obtain r.
13. if $r \neq \hat{r}$ then
14. S sends a reject message to U.

15. else if r=r̂ then
16. S sends an accept message to U.
17. else if S finds that c does not contain any object from s then
18. S sends an accept message to U.

During the above authentication process, the user logs in the online transaction system 100 using their username (for example, "John Smith", which has been registered during the registration process). The user is then presented with a screen of/images each having a corresponding weight (from $Z_d$) below the image, as shown in FIG. 4(*b*). In FIG. 4(*b*), l=30 and d=5. Both the set of l images and their corresponding weights may be generated uniformly at random.

As described above, the user then sums up the weights (numbers "3", "0", "1") corresponding to the user's secret images (i.e., designated images "fried chips", "optical disk", and "horse") in the cognitive challenge, performs the operation (the sum modulo 5) to determine the solution (number "4") to the cognitive solution. The user draws a graphical symbol, particularly, the English word "four" on the second user interface 240 (i.e., the touch-sensitive screen as shown in FIG. 4(*c*)) of the service access device 103 as a response to the cognitive challenge. In case none of the secret images (i.e, designated images) are present, the user may simply determine a random integer from Z d as the solution to the cognitive challenge and draw the corresponding English word as the response on the the touch-sensitive screen of the service access device 103.

Upon receipt of the response (for example, the English word "four" drawn by the user) provided by the user via the second user interface 240 of the service access device 103, method 300 extracts the biometric feature of the user from response. Method 300 further determines a further reference biometric feature based on the biometric feature extracted from the response and a criterion, for example, a Dynamic Time Wrapping (DTW) distance. Specifically, method 300 compares the biometric feature with each of the reference biometric features identified by "John0", "John1", "John2", "John3", and "John4" stored in the "reference feature" field 520 of the first entry of the table 500. Since the biometric feature extracted from the response is not necessarily exactly the same as one of the reference biometric features stored in the table 500, method 300 determines one of the reference biometric features that is closest, in terms of DTW distance, to the biometric feature extracted from the response as the further reference biometric feature. In this example, if the user draws the English word "four" properly, the further reference biometric is the reference biometric feature identified by "John4".

Method 300 then determines a further reference solution to the cognitive challenge. The further reference solution is one of the reference solutions that is associated with the further reference biometric feature. In this example, the further reference solution is the number "4" that is associated with the further reference biometric feature identified by "John4", as shown in the first entry of the table 500.

Method 300 compares the reference solution that is already determined with the further reference solution, and determines the biometric feature extracted from the response matches the reference biometric feature associated with the reference solution if the further reference solution is equal to the reference solution. In this example, since the reference solution (i.e., the number "4") determined by method 300 from the cognitive challenge is equal to the further reference solution (i.e., the number "4") determined from the response provided by the user, the biometric feature extracted from the response (i.e., the English word "four") is considered to match the reference biometric feature (i.e., the reference biometric feature identified by "John4") associated with the reference solution (i.e., the number "4").

To further enhance security, the method determines, based on the criterion, a distance (for example, a DTW distance) between the biometric feature extracted from the response and the reference biometric feature associated with the reference solution. If the distance meets a threshold, method 300 determines the biometric feature extracted from the response matches the reference biometric feature associated with the reference solution.

It should be noted that other feature matching methods can also be used to match the biometric feature extract from the response and the reference biometric feature without departing from the scope of the present disclosure. For example, method 300 uses Optical Character Recognition (OCR) technologies to recognise the English word "four" directly from the image "four", and compares the reference biometric feature associated with the English word "four" with the biometric feature extract from the image "four" before authenticating the user to access the service. In this case, the structure of the table 500 may be different accordingly.

Registration Process

The system may register a user to authenticate the user by receiving from a third user interface a selection of cognitive information elements designated by the user as a secret set of cognitive information elements, determining the reference biometric feature of the user based on the interaction of the user with the third user interface and storing in a storage device the biometric feature. This registration process allows for the system to acquire and store a biometric feature of the user that can be used to authenticate the user during the authentication process.

This registration process is presented on a third user interface, which may or may not be the same as the first user interface or the second user interface. For example the user may authenticate on a device with the first user interface or second user interface, having already registered on a device with the third user interface. Alternatively, the user may register and authenticate on the same device with the same user interface. In the example below the third user interface is referred to as the first user interface and second interface.

Figure 6:
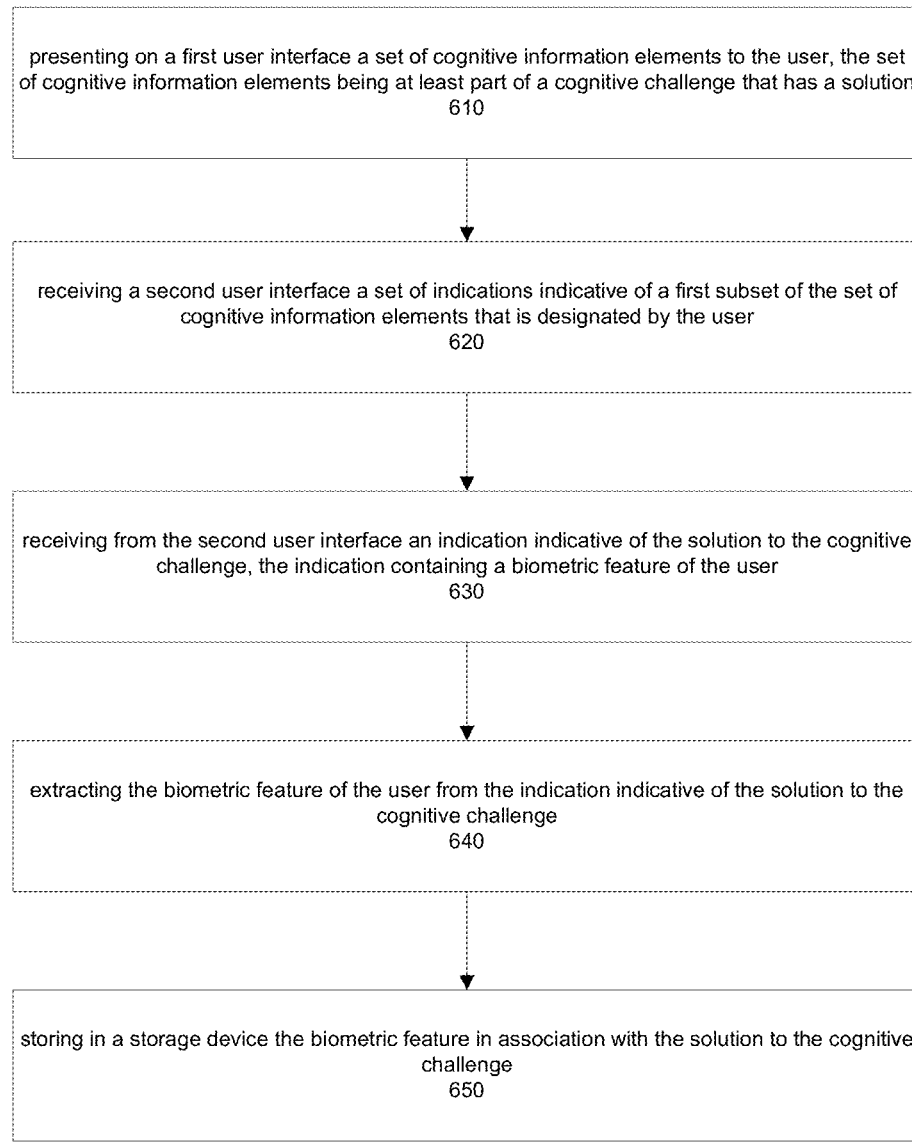
FIG. 6 illustrates an example method for authenticating a user in accordance with the present disclosure.

FIG. 6 illustrates an example method 600 for registering a user with the online transaction system 100 to authenticate the user in accordance with the present disclosure, particularly, when the user registers at service access devices 103. Although method 600 in this example is implemented at the service access device 103, method 600 can also be implemented at the service point 105 if the service access device 103 is part of the service point 105 or the service point 105 also performs user registration functions in addition to providing services to the user. As another example, method 600 is implemented at a separate registration server (not shown in FIG. 1) to reduce the computing burden of the service access point 103. Method 600 may also include method steps that are not shown in FIG. 6.

Figure 7C:
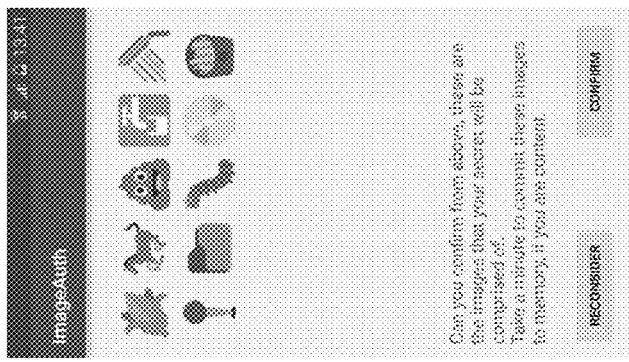
FIGS. 7(a) to 7(c) illustrate screenshots of a registration process in accordance with the present disclosure.
Figure 7B:
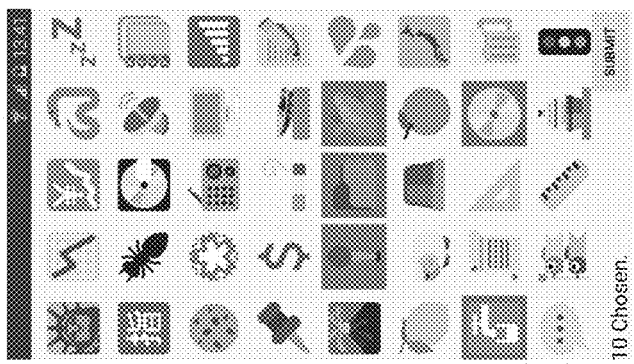
Figure 7A:
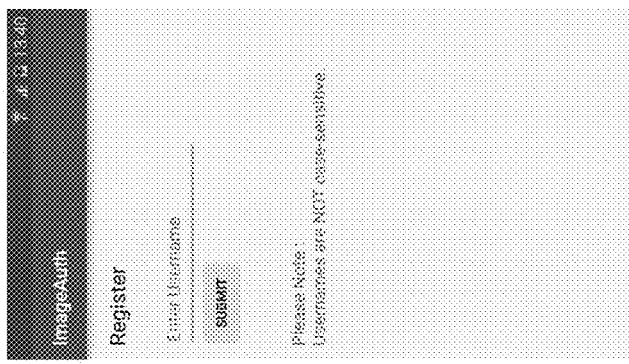
Figure 8A:
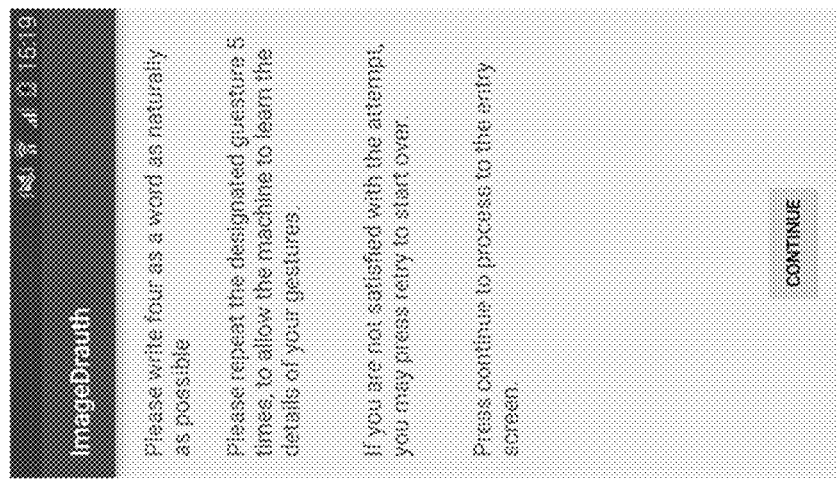
FIGS. 8(a) to 8(c) illustrate screenshots of an example registration process in accordance with the present disclosure.
Figure 8B:
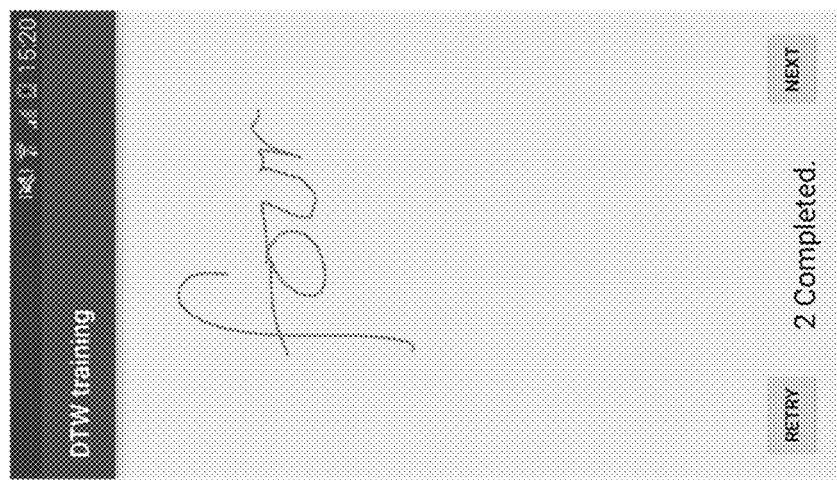
Figure 8C:
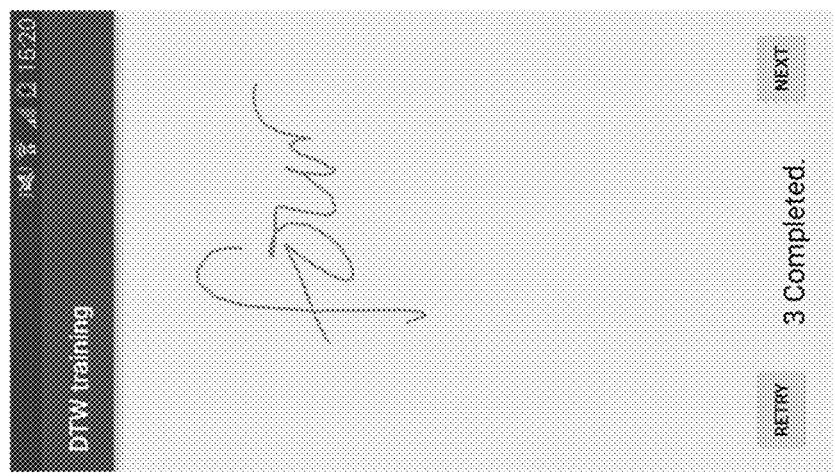
Figure 8E:
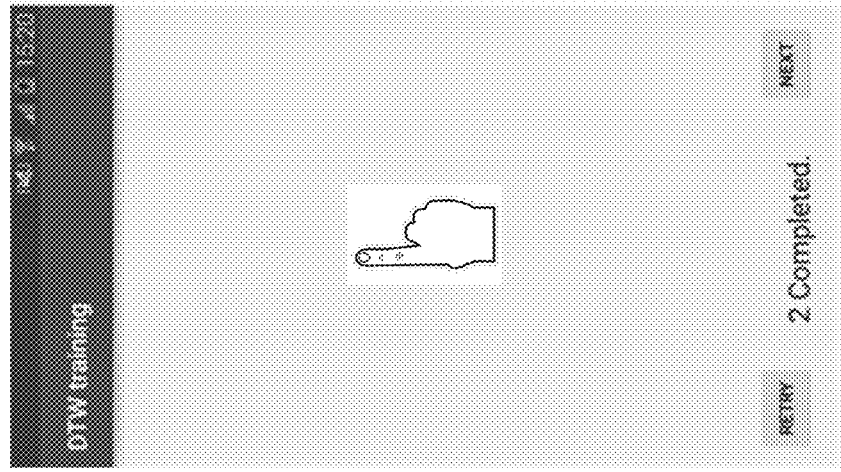
FIGS. 8(d) to 8(e) illustrate screenshots of alternative example registration process in accordance with the present disclosure.
Figure 8D:
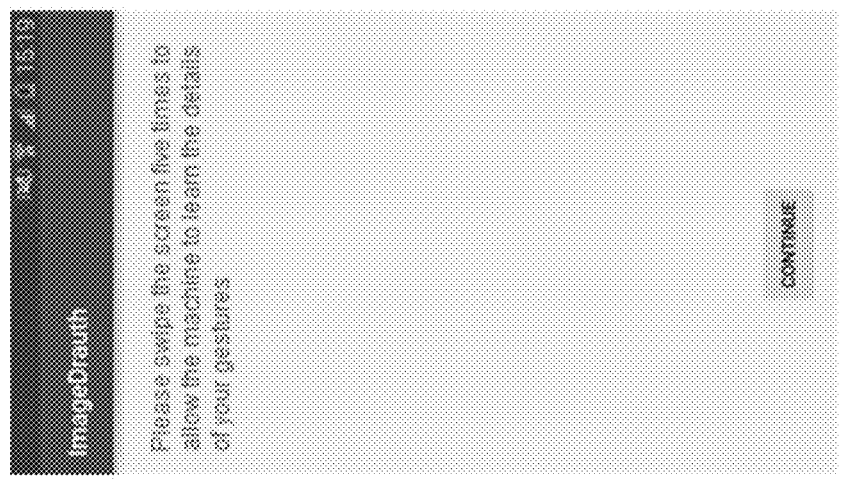

When the user registers with the online transaction system 100, method 600 asks the user to provide a user name. As shown in FIG. 7(*a*), the user is prompted to enter a user name on the first user interface 230 (i.e., the touch-sensitive screen) of the service access device 103. The user enters, for example, "John Smith", as its user name and submits the user name to the service access device 103 by touching the "submit" button. Upon receipt of the user name at the service access device 103, the service access device 103 generates an entry of the table 500 as shown in FIG. 5 with the "user name" field 512 of the entry containing the user name "John Smith" to identify the user.

Method 600 presents 610 on the first user interface 230 of the service access device 103 a set of cognitive information elements to the user. The set of cognitive information elements are at least part of a cognitive challenge that has a solution. As shown in FIG. 7(*b*), the set of cognitive information elements in this example are a set of images rendered on the touch-sensitive screen.

The user reviews these images and designates one or more of these images as secret images. For example, the user touches on the second user interface 240 (i.e., the same touch-sensitive screen in this example) of the service access device 103 the one or more of these images that he or she wants to designate as secret images. As shown in FIG. 7(*c*), the user has designated ten images as the secret images. The images for the user to review and designate may be presented on multiple pages on the touch-sensitive screen.

If user is satisfied with the images designated, the user touches the "Confirm" button on the touch-sensitive screen, as shown in FIG. 7(*c*). Method 600 receives 620 from the touch-sensitive screen a set of indications indicative of a first subset of the set of cognitive information elements that is designated by the user as a secret set of cognitive information elements. Method 600 stores the first subset of the set of cognitive information elements as designated CIEs in the "CIE" field 514 of the entry identified by the user name "John Smith", i.e., the first entry of the table 500. For cognitive information elements that are not designated, method 600 can also store a second subset of the set of cognitive information elements as undesignated CIEs in the "CIE" field 514 of the entry identified by the user name "John Smith".

Method 600 presents on the touch-sensitive screen an indication to the user indicative of an operation (particularly, "Add and Mod 5" in the first entry of the table 500) that is used to solve the cognitive challenge. The indication indicative of the operation may also be sent to the user via an electronic message, e.g., an e-mail or SMS message.

As described above, the designated challenge elements and the undesignated challenge elements are used to construct a cognitive challenge that has a solution when the user logs in the online transaction system 100.

To associate each of the possible solutions to the cognitive challenge with a reference biometric feature that represents the solution. Method 600 is prompted to provide one or more training responses (for example, images) via the touch-sensitive screen to represent the solution. As shown in FIGS. 8(*a*) to (*c*), the user is prompted to draw a English word "four" twice. The English word "four" is associated with a numerical solution "4". Therefore, method 600 receives 630 from the touch-sensitive screen an indication indicative of the solution to the cognitive challenge. The indication comprises a set of data indicative of the user interacting with the touch-sensitive screen, and contains a biometric feature of the user that is associated with the English word "four". As shown in FIGS. 8(*d*) and 8(*e*) the user is prompted to swipe the touch-sensitive screen five times. The method 600 receives from the touch-sensitive screen a set of data indicative of the user interacting with the touch-sensitive screen and contains a biometric feature of the user that is associated with the users swipe gesture.

Method 600 extracts 640 the biometric feature of the user from the indication indicative of the solution to the cognitive challenge, particularly, the set of data received from the touch-sensitive screen. In the example shown in FIGS. 8(*a*) to 8(*e*), the second user interface 240 of the service access device 103 is the touch-sensitive screen and the touch-sensitive screen includes a touch-sensitive surface. The set of data indicative of the biometric features of the user comprises one or more of the following:

a graphical symbol drawn by the user using a tool on the touch-sensitive surface, the graphical symbol including a plurality of points;

a spatial relationship between the plurality of points of the graphical symbol;

a temporal relationship between the plurality of points of the graphical symbol;

a pressure the user imposed on the touch-sensitive surface through the tool;

a position of the tool;

a movement direction of the tool;

a velocity of the tool;

an acceleration of the tool;

a boundary of the graphical symbol;

a width of the graphical symbol;

a height of the graphical symbol; and an area of the graphical symbol.

As another example, the second user interface 240 of the service access device 103 comprises one or more sensors, for example, an accelerometer, a gyroscope, a gesture sensitive device. In this case, the set of data comprises one or more readings from the second user interface 240.

Upon receipt of the the set of data at the processor 210 from the second user interface 240, the biometric feature is extracted from the set of data. As part of feature extraction, pre-processing steps may also be performed, for example, offset correction, linear detrending, and smoothing. In the example shown in FIGS. 8(*a*) to 8(*c*), the biometric feature extracted from the training responses (i.e., the English words "four" drawn by user) is a biometeric feature identified by "John4".

Method 600 further stores 650 in a storage device the biometric feature in association with the solution to the cognitive challenge. As shown in FIG. 5, the biometric feature "John4" representing the English word "four" is stored in the table 500, which is in turn stored in the storage device 107, as a reference biometric feature in association with the numerical solution "4". The reference biometric feature is also referred to as a template in the present disclosure. The user's biometric template may be changed after registration in order to reflect possible changes in the way the user performs a gesture such as a swipe or the user draws a symbol. For example, if a biometric feature extracted from a response provided by the user results in a successful authentication, the stored template may be replaced with the biometric feature in order to capture the recent gesturing or handwriting habits of the user.

The above registration process repeats for each of the possible numerical solutions "0" to "4" to the cognitive challenge and for each user. The table 500 is formed as a result of users registering with the online transaction system 100. A MYSQL database may be used to store the table 500, and SQL queries are used to store and retrieve data as needed.

A pseudo-code representation of the registration process is as follows:

1. U designates a set s of k objects from N as its password and shares it with S.

2. For each symbol $\omega \in \Omega$, U sends r sketches to S.

3. For each $\omega \in \Omega$, from the corresponding set of r user sketches, S trains the classifier b to obtain template $\omega_T$.

4. S uses the set of template T of all symbol templates $\omega_T$, to train the classifier b to output $\bot$.

5. S stores the set of template T.
6. The secret consists of s and T.

In the above registration process, the set N consists of n images. The user needs to designate k images to make up their secret. To ensure that the user designation is random, the n images can be shuffled randomly and a subset (say l) of the n images are shown at a time during registration. The user can designate an image by touching it on the second user interface 240 (e.g. the touch-sensitive screen) of the service access device 103. The user can swipe right to view the next page containing the next l images. The process concludes once the user has chosen k images.

Feature Comparison

Graphical symbols. As described above, graphical symbols are used as responses to the cognitive challenge when the user logs in the online transaction sytem 100 or as the training responses when the user registers with the online transaction system 100. The graphical symbols need to exhibit the following properties:

the biomeric features of the graphical symbols should be able to distinguish different graphical symbols;

the biometric features of the graphical symbols should be able to distinguish different users; and the graphical symbols should be able to be reproduced between attempts.

In the present disclosure, English words "zero", "one", "two", "three" and "four" are used as the graphical symbols to represent numerical solutions "0", "1", "2", "3" and "4" to the cognitive challenge. As another example, other graphical symbols can also be used without departing from the scope of the present disclosure.

Biometric Features. An example set of biomentric features that is used to compare the biometric feature extracted from the response to the cognitive challenge with the reference biometric features is described below. Please note that these biometric features exist in a time-series format with data-points at the fastest rate of record by the hardware device:

$\delta p$: the change in pressure applied to the screen of the current data-point from the previous point;

$\delta x$: the change in x position of the current data-point from the previous point;

$\delta y$: the change in y position of the current data-point from the previous point;

$v_x$: the velocity in x direction of the current data-point from the previous point;

$v_y$: the velocity in y direction of the current data-point from the previous point;

$a_x$: the acceleration in x direction of the current data-point from the previous point;

$a_y$: the acceleration in y direction of the current data-point from the previous point;

Area: the rectangular area currently occupied from the start to the current point being drawn;

Curvature: the amount of curvature at the point as calculated by $$k = \sqrt{\frac{(a_y v_y - a_x v_x)^2}{(v_y^2 + v_x^2)^{3/2}}}$$

$\theta_{slope}$: the tangential angle of the current heading between the previous data-point and the current point $$\theta_{slope}[n] = \arctan\frac{\dot{y}[n]}{\dot{x}[n]};$$

$\theta_{path}$: the angle created by the previous, current and next points $$L_{12} = \sqrt{x[n]^2 - x[n-1]^2}$$
$$L_{13} = \sqrt{x[n]^2 - x[n+1]^2}$$
$$L_{23} = \sqrt{x[n-1]^2 - x[n+1]^2}$$
$$\theta_{path}[n] = \arccos\frac{L_{12}^2 + L_{13}^2 - L_{23}^2}{2L_{12}L_{13}}.$$

Feature comparison. With a common set of features the similarity between two biometric features can be determined by comparing the two biometric features. Further, a threshold is used to determine if two biometric feature belong to the same user or differ too greatly for the authentication process.

Since the biometirc features used in the present disclosure are time-series based features, Dynamic Time Warping (DTW) can be used to classify these features. It should be noted that other classification algorithms can also be used to classify these features without departing from the scope of the present disclosure, for example, Support Vector Machine (SVM). DTW is an algorithm for mapping one time-series indicative of a biometric feature to another time-series indicative of another biometric feature. DTW determines the shortest path in order to map one time-series to another, where the shortest path is defined as the minimum distance between the two time-series. DTW also maps one time-point to another and calculates the difference in their values. This difference contributes to the distance between the time-series.

Figure 9:
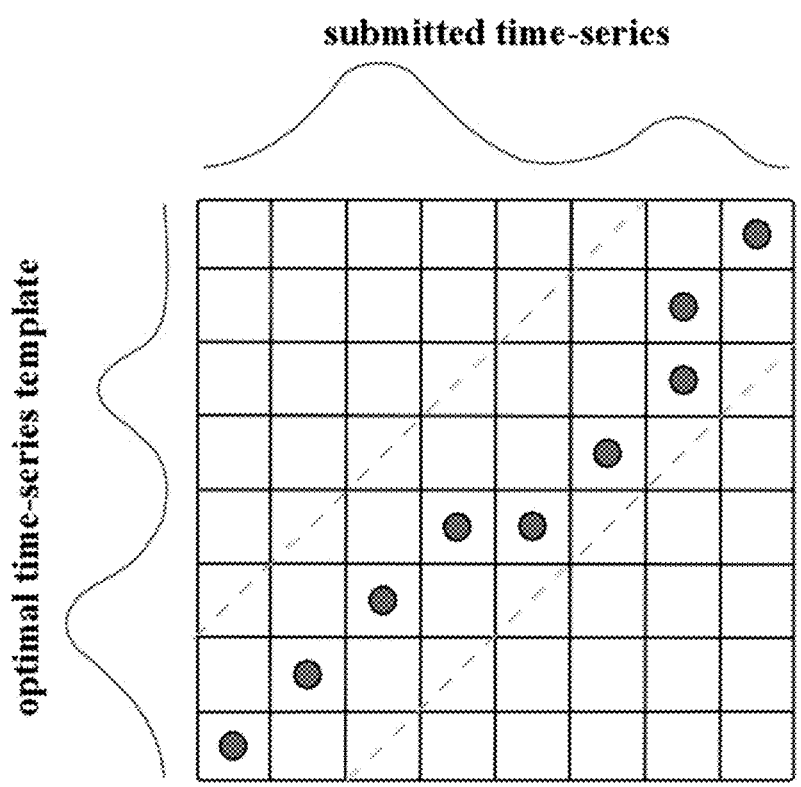
FIG. 9 illustrates a mapping of a submitted timeseries to an optimal template in accordance with the present disclosure.

FIG. 9 illustrates a mapping 900 of a submitted timeseries to an optimal template in accordance with the present disclosure.

The submitted time-series indicates the biometric feature extracted from a response provided by the user when the user attempts to log in the online transaction system 100. The submitted time-series is compared against the optimal template that indicates one of the reference biometirc features.

Although FIG. 9 illustrates a single dimension mapping, DTW algorithm can use multiple features each considered as its own dimension. While the FastDTW algorithm provided by the Java Machine Learning library at http://java-ml.sourceforge.net is capable of handling higher-dimensional time-series, the biometric feature can also be split into independent data groups. The groups are defined as to which sensor the biometric features have primarily been derived from, e.g. displacement, velocity are derived from touch locations, whilst pressure would be from the pressure detection within the screen, and movement data from the accelerometer would be in its own groupings. The distance outputs from each of the individual DTW processes are summed up to produce a single value of similarity between the two time-series. This value is compared to a threshold as described below:

Group Threshold. In the group threshold, the threshold of a user is determined by how distant a user's writing samples are from everyone else in the collective group. The algorithm is as follows: the optimal template will be run against every other handwriting sample in the database from other users, and an array of distances created. The lowest distance to another sample that does not belong to a user is then set as the threshold. Whilst this approach is suitable for limited samples set of small number of participants, for an online transaction system that has potentially thousands of users, the group threshold calculated would be too sensitive to all accurate authentication;

Personal Threshold. The idea behind personal threshold is a threshold is assigned to the user itself based on how consistent or inconsistent a user is based on the training samples that were acquired during the registration process. Initially the personal threshold was calculated by finding the mean of the distances between the user's own samples, and adding a parameter which is a multiple of the standard deviation to the mean as the threshold threshold=μ+kσ, foreseeable problems with this approach include users with higher than normal inconsistencies within their writing samples, and raises the question of when to limit the threshold before security of the biometrics is compromised;

Global Threshold. A global threshold is a singular value chosen by the system administrators, depending on the level of security demanded by the system. This level is recommended based on a base number as seen by group thresholds, and an adjustment factor for the usability-security compromise. The higher the threshold, the more usable and tolerant it will be to user deviations;

System Demand. From a resource consumption standpoint from the lowest to greatest consumption: Global, Personal, Group. For Personal and Group thresholds the threshold needs to be calculated for each user upon registration, however group needs to retroactively recalculate each other user's threshold as well, with the addition of new data into the collective pool, causing a spike in data movement and computational power required. And becomes unviable for a larger userbase unless random subsets of users are taken for threshold recalculation.

As described above, optimal templates are used in order to reduce the number of comparisons required during the login attempt. So with a regular login attempt, the submitted timeseries will only need to be compared with a single optimal template as opposed to all the samples.

The way this optimal template is determined is each sample has its DTW distance computed against the other samples in the user's set, and summed together. The sample with the lowest collective distances to the other samples is designated as the optimal template, the reasoning behind this is that the sample is the closest to each and every other sample of the user, being the middle sample median.

A detailed process of comparing the biometric feature extracted from the response with the reference biometric features (i.e., optiaml templates) using DTW distance is as follows:

Method 300 retrieves five optimal templates or reference biometric features for five symbols (e.g., English words "zero", "one", "two", "three", "four");

Method 300 compares the biometric feature extracted from the response to each of the 5 optimal templates in terms of distance computed through DTW;

Method 300 determines an optimal template out of the five optimal templates with the lowest DTW distance to the extracted biomeric feature. This optimal template is considered to be the one the user intended to provide in response to the cognitive challenge;

Method 300 determines a numerical solution associated with the optimal template;

If the numerical solution with the optimal template is not equal to the numerical solution to the cognitive challenge, method 300 rejects the user;

If the DTW distance of the biometric feature extracted from the response to the correct optimal template is above the threshold, method 300 rejects the user;

If the user is successful, method 300 presents how many login rounds have been passed, and issues a new challenge or a token to indicate authentication to the user.

Performance Analysis

Unique Challenges. As the login screen contains l=30 images from a pool of n=200, and each image has a weight from $Z_d$, the total number of possible challenges is $$\binom{n}{l}d^l = \binom{200}{30}5^{30} \approx 2^{188}$$

Denote the above by |C|. The probability that in a set of m random challenges, at least 2 challenges are the same can be estimated by the probability of "birthday collisions" (see reference [2]) as $$p(m,|C|) \approx 1 - e^{m(m-1)/2|C|}.$$

Re-arranging the above, we get $$m \approx \sqrt{2|C|\ln\frac{1}{1-p(m,|C|)}}.$$

Letting p(m,|C|)=0.5, we get m≈$2^{94}$. Thus, this same challenge does not occur frequently.

Zero Case. Since the login screen may be random there is a possibility that none of the secret images appears. To handle this case, the user is allowed to submit any of the d responses. Note that the user can also be prompted to draw the English word "zero" as the response. However, sending the English word "zero" allows the attacker to reduce the problem of finding the secret as finding a solution to system of linear equations. The attacker can then find the secret after observing only about n≈200 authentication rounds. To increase security, noise is introduced to an attackers data by letting the user respond with a graphical symbol associated with a random solution from $Z_d$.

The probability that i secret images are present in a challenge of l images is given by the probability mass function of the hypergeometric distribution:

$$P(|s \cap c| = i) = \frac{\binom{k}{i}\binom{n-k}{l-i}}{\binom{n}{l}}.$$

The expected value is $$\frac{lk}{n},$$

which with l=30, k=10 and n=200 is 1.5. Thus, 1.5 secret images is expected to be present in each challenge. The probability that no secret image is present in the challenge is $$P(|s \cap c| = 0) = \frac{\binom{k}{0}\binom{n-k}{l-0}}{\binom{n}{l}} = \frac{\binom{n-k}{l-0}}{\binom{n}{l}}.$$

With the above parameter values, the above probability is ≈0.189.

Challenge rounds. The probability that someone who is not the user can successfully login is dependent on whether the current cognitive challenge contains any secret image or not.

In state-of-the-art cognitive authentication methods, this probability is precisely $$P(\text{randomguess}) = P(|s \cap c| = 0) \cdot 1 + (1 - P(|s \cap c| = 0))\frac{1}{d}$$

$$= 0.189 + (1 - 0.189)\frac{1}{5}$$

$$= 0.351,$$

which means that approximately 1 in 3 attempts could defeat the cognitive challenge. To combat this, multiple challenge rounds need to be issued during one authentication session. With just 3 challenge rounds the probability is reduced to 0.030. However, to achieve a further level of security the number of rounds needs to increased further, which in turn increases cognitive load on the user, and hence authentication time.

The above is an inherent problem with state-of-the-art cognitive authentication methods. To mitigate that, biometrics features are introduced in the present disclosure, such that the responses from the cognitive challenges are mapped to the biometric features. Relying on high accuracy of the biometric features, the probability of a random (or informed) guess attack is reduced without increasing the number of challenge rounds.

It should be understood that the example methods of the present disclosure might be implemented using a variety of technologies. For example, the methods described herein may be implemented by a series of machine executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as internet.

It should also be understood that, unless specifically stated otherwise as apparent from the following discussion, it is appreciated that throughout the description, discussions utilizing terms such as "determining", "obtaining", or "receiving" or "sending" or "generating" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

REFERENCES

[1] Berry Schoenmakers. Lecture Notes Cryptographic Protocols. Version 1.2, http://www.win.tue.nl/berry/2WC13/LectureNotes.pdf, 2016.
[2] M. Sayrafiezadeh. The Birthday Problem Revisited. Mathematics Magazine, 67(3):220-223, 1994.

The invention claimed is:

1. A computer implemented method for authenticating a user, the method comprises:
   presenting on a first user interface a challenge set of different cognitive information elements to the user, the challenge set of different cognitive information elements being at least part of a cognitive challenge that has a reference solution wherein the reference solution is based on an intersection of the challenge set of different cognitive information elements and a secret set of different cognitive information elements;
   receiving from a second user interface a response to the cognitive challenge, wherein the response does not include input or selection of cognitive information elements in the secret set of different cognitive information elements in order to conceal the secret, and the response being indicative of the user recognizing cognitive information elements from the secret set of different cognitive information elements and thereby determining that any object from the secret set of different cognitive information elements is in the challenge set of different cognitive elements, and the response containing a biometric feature of the user;
   extracting the biometric feature of the user from the response received from the second user interface; and
   authenticating the user if the biometric feature extracted from the response matches a reference biometric feature associated with the reference solution.

2. The computer implemented method according to claim 1, wherein the reference solution comprises a result of an operation based on the intersection of the challenge set of cognitive information elements and the secret set of cognitive information elements.

3. The computer implemented method according to claim 1, wherein the reference solution is based on an arrangement of the challenge set of cognitive information elements.

4. The computer implemented method according to claim 1, wherein the reference solution is a first reference solution and the response is a first response, the method further comprising:
   presenting a second cognitive challenge that has a second reference solution; receiving a second response;
   extracting the biometric feature from the second response; and
   authenticating the user if the biometric feature extracted from the first response and the second response match the reference biometric feature associated with the first reference solution and second reference solution.

5. The computer implemented method according to claim 1, wherein the first user interface is a screen, and presenting on the first user interface the challenge set of cognitive information elements comprises presenting on the screen a set of images and presenting a set of numbers associated with the set of images.

6. The computer implemented method according to claim 5, wherein the set of images comprises: a first subset that represents the intersection that includes zero, one or more images of the secret set of cognitive information elements; and a second subset including one or more images that are all not in the secret set of cognitive information elements.

7. The computer implemented method according to claim 6, wherein the first subset includes one or more images of the secret set of cognitive information elements, and authenticating the user further comprises:
determining one or more numbers in the set of numbers associated with the first subset;
determining an operation to be performed on the one or more numbers;
performing the operation on the one or more numbers to determine the reference solution to the cognitive challenge; and
determining the reference biometric feature based on the reference solution.

8. The computer implemented method according to claim 7, wherein authenticating the user further comprises:
determining a further reference biometric feature based on the biometric feature and a criterion;
determining a further reference solution to the cognitive challenge, the further reference solution being associated with the further reference biometric feature; and
determining the biometric feature extracted from the response matches the reference biometric feature associated with the reference solution if the further reference solution is equal to the reference solution.

9. The computer implemented method according to claim 8, further comprising:
determining, based on the criterion, a distance between the biometric feature extracted from the response and the reference biometric feature associated with the reference solution; and
determining the biometric feature extracted from the response matches the reference biometric feature associated with the reference solution if the distance meets a threshold.

10. The computer implemented method according to claim 1, wherein the response comprises a set of data indicative of the user interacting with the second user interface.

11. The computer implemented method according to claim 10, wherein extracting the biometric feature comprises extracting the biometric feature from the set of data.

12. The computer implemented method according to claim 10, wherein the second user interface is the screen and the screen includes a touch-sensitive surface, and the set of data comprises one or more of the following:
a graphical symbol drawn by the user using a tool on the touch-sensitive surface, the graphical symbol including a plurality of points;
a spatial relationship between the plurality of points of the graphical symbol;
a temporal relationship between the plurality of points of the graphical symbol; a pressure the user imposed on the touch-sensitive surface through the tool;
a position of the tool;
a movement direction of the tool; a velocity of the tool; an acceleration of the tool;
a boundary of the graphical symbol; a width of the graphical symbol;
a height of the graphical symbol; and an area of the graphical symbol.

13. The computer implemented method according to claim 10, wherein the second user interface comprises one or more of an accelerometer, a gyroscope, and a gesture-sensitive device, and the set of data comprises one or more readings from the second user interface.

14. A computer implemented method for registering a user to authenticate the user according to claim 1, the method further comprising:
receiving from a third user interface a selection of cognitive information elements designated by the user as a secret set of cognitive information elements;
determining the reference biometric feature of the user based on the interaction of the user with the third user interface; and
storing in a storage device the biometric feature.

15. The computer implemented method according to claim 14,
further comprises presenting on the third user interface a further indication to the user indicative of an operation that is used in the cognitive challenge.

16. A non-transitory computer-readable medium tangibly embodying a computer-readable program, including machine-readable instructions, when executed by a processor, causes the processor to perform the method of claim 1.

17. A computing device for authenticating a user, the computer system comprising:
a first user interface;
a second user interface; and
a processor that is connected to the first user interface and the second interface, the processor being configured to:
present on the first user interface a challenge set of different cognitive information elements to the user, the challenge set of different cognitive information elements being at least part of a cognitive challenge that has a reference solution, wherein the reference solution is based on an intersection of the challenge set of different cognitive information elements and a secret set of different cognitive information elements;
receive from the second user interface a response to the cognitive challenge, wherein the response does not include input or selection of the secret set of different cognitive information elements in order to conceal the secret, the response being indicative of the user recognizing cognitive information elements from the secret set of different cognitive information elements and thereby determining that any object from the secret set of different cognitive information elements is in the challenge set of different cognitive elements, and the response containing a biometric feature of the user;
extract the biometric feature of the user from the response received from the second user interface; and
authenticate the user if the biometric feature extracted from the response matches a reference biometric feature associated with the reference solution.

* * * * *